(12) United States Patent
Morinaga et al.

(10) Patent No.: US 9,146,636 B2
(45) Date of Patent: Sep. 29, 2015

(54) MOBILE INFORMATION TERMINAL AND PLACEMENT AREA ACQUISITION METHOD

(75) Inventors: Yasuo Morinaga, Chiyoda-ku (JP);
Manabu Ota, Chiyoda-ku (JP);
Masakatsu Tsukamoto, Chiyoda-ku (JP); Takeshi Higuchi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 119 days.

(21) Appl. No.: 14/110,731

(22) PCT Filed: Jun. 20, 2012

(86) PCT No.: PCT/JP2012/065732
§ 371 (c)(1),
(2), (4) Date: Oct. 9, 2013

(87) PCT Pub. No.: WO2013/002091
PCT Pub. Date: Jan. 3, 2013

(65) Prior Publication Data
US 2014/0028602 A1    Jan. 30, 2014

(30) Foreign Application Priority Data

Jun. 29, 2011   (JP) ................................. 2011-143936

(51) Int. Cl.
*G06F 3/041* (2006.01)
*G06F 1/16* (2006.01)
*G06F 3/0488* (2013.01)

(52) U.S. Cl.
CPC ............ *G06F 3/0414* (2013.01); *G06F 1/1626* (2013.01); *G06F 1/1684* (2013.01); *G06F 3/04886* (2013.01); *H04M 2250/12* (2013.01); *H04M 2250/22* (2013.01)

(58) Field of Classification Search
CPC ..... G06F 1/1626; G06F 3/0488; G06F 1/169; G06F 3/0414; G06F 3/016; G06F 3/04886; G06F 1/1684; G06F 21/316; H04M 2250/22

USPC ............... 345/156, 173, 174, 619; 178/18.04; 715/864, 810, 863
See application file for complete search history.

(56) References Cited

U.S. PATENT DOCUMENTS

2010/0085317 A1*   4/2010   Park et al. ..................... 345/173

FOREIGN PATENT DOCUMENTS

JP        2006 18505        1/2006
JP        2008 27183        2/2008
(Continued)

OTHER PUBLICATIONS

Extended European Search Report issued Oct. 27, 2014 in Patent Application No. 12804326.2.
(Continued)

*Primary Examiner* — Koosha Sharifi-Tafreshi
(74) *Attorney, Agent, or Firm* — Oblon, McClelland, Maier & Neustadt, L.L.P.

(57) ABSTRACT

A mobile information terminal that can acquire an optimum placement area for a controllable object, regardless of variability in user's gripping features among individuals. A pressure sensor array acquires a gripping pressure distribution; a gripping pressure logger records time-series changes in gripping pressure at each pressure sensor forming the pressure sensor array; a gripping pressure change point detection unit includes a gripping pressure change amount calculation section that acquires time-series changes in gripping pressure at each pressure sensor and determines whether the change in gripping pressure per unit time exceeds a predetermined value at any pressure sensor; and a placement area acquisition section specifies, when the change in gripping pressure per unit time exceeds the predetermined value at any pressure sensor, an optimum placement area for a controllable object with reference to a position where the change in gripping pressure per unit time exceeds the predetermined value.

9 Claims, 28 Drawing Sheets

(56) References Cited

FOREIGN PATENT DOCUMENTS

| JP | 2009 169820 | 7/2009 |
|---|---|---|
| JP | 2009-169820 A | 7/2009 |

OTHER PUBLICATIONS

"Xperia™ pro MK16 Extended User Guide," Sony Ericsson, http://www-support-downloads.sonymobile.com/mk16/userguide_EN_MK16_1251-9061.1.pdf BNSDOCID, XP55140042A, 2011, pp. 1-117.

Kee-Eung Kim, et al., "Hand Grip Pattern Recognition for Mobile User Interfaces," Samsung Advanced Institute of Technology, No. 18$^{th}$, XP2718299A, 2007, pp. 1789-1794.

Office Action issued Feb. 18, 2014 in Japanese Patent Application No. 2011-143936 (with English language translation).

Japanese Office Action issued Apr. 30, 2014 in Patent Application No. 2011-143936 with English Translation.

International Search Report Issued Sep. 18, 2012 in PCT/JP12/065732 filed Jun. 20, 2012.

* cited by examiner

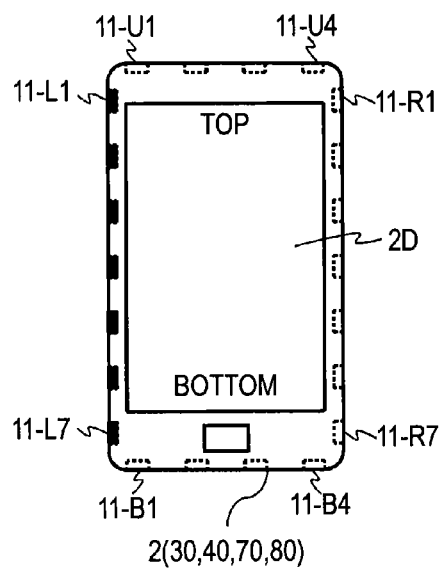
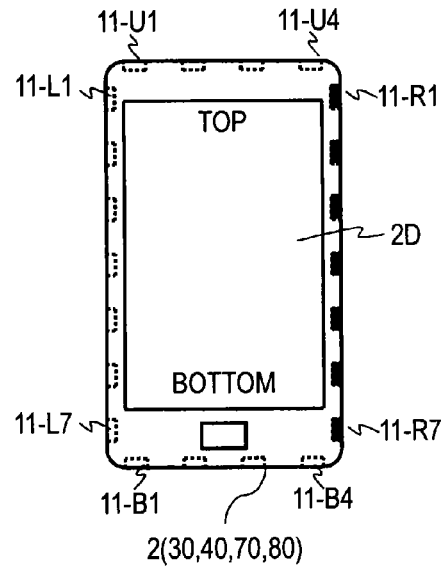
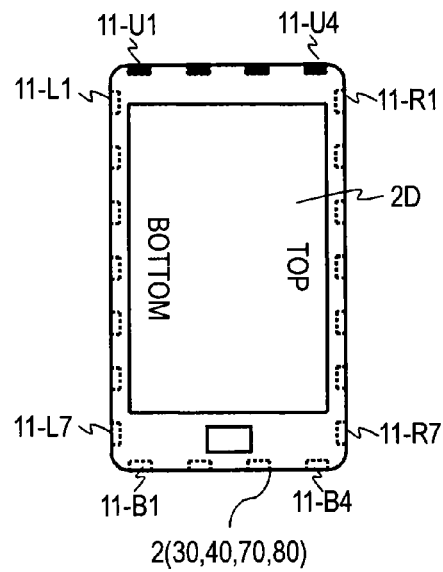
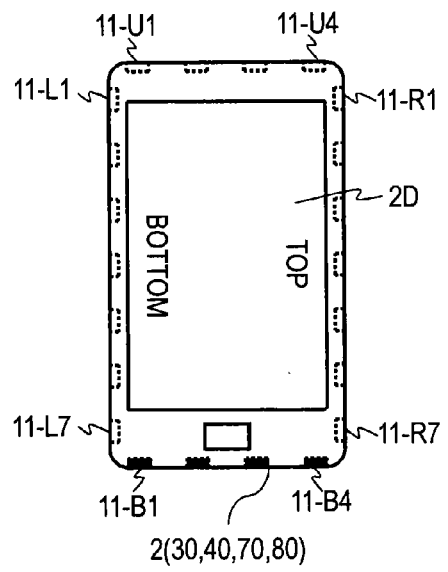

MOBILE INFORMATION TERMINAL AND PLACEMENT AREA ACQUISITION METHOD

TECHNICAL FIELD

The present invention relates to a mobile information terminal having a function to determine a user's operation state (one-handed or two-handed operation, etc.) from gripping features obtained when the mobile information terminal is gripped and a placement area acquisition method.

BACKGROUND ART

Mobile information terminals having a touch sensitive screen as a user interface have been coming into use in recent years. The user can intuitively operate the mobile information terminal with a touch sensitive screen by touching the screen with a finger or by sliding the finger on the screen. Many recent mobile information terminals incorporate an accelerometer, and those mobile information terminals can automatically switch the display orientation of the display screen in accordance of the direction of gravitational force sensed by the accelerometer. This allows the user to use the mobile information terminal in a variety of gripping states and operation states according to the circumstances. For example, the user may grip the mobile information terminal in the right hand and operate the terminal with the right fingers alone (right thumb mainly), may grip the mobile information terminal in the left hand and operate the terminal with the left fingers alone (left thumb mainly), may grip the mobile information terminal in the right hand and operate the terminal with the left fingers alone (left index finger mainly), and may grip the mobile information terminal in the left hand and operate the terminal with the right fingers alone (right index finger mainly). Moreover, the user may not grip the mobile information terminal but may place it on a stand and operate it with right fingers or left fingers, and may also grip the mobile information terminal in both hands and operate it with fingers of both hands (both thumbs mainly), for example.

Although the gripping states and operation states of the mobile information terminal vary as described above, conventional mobile information terminals cannot perform screen display suited to each gripping state and each operation state. For example, if the user grips the terminal in the right (left) hand and attempts to operate the touch sensitive screen with the right (left) thumb (this operation method will be referred to as one-handed operation), some areas of the touch sensitive screen, such as the top right corner, the bottom left corner, the top left corner, and the bottom right corner, become difficult to reach for the right (left) thumb. If an icon or link is displayed in those areas, it has been difficult for the user to touch the icon or link displayed in those areas while performing one-handed operation. For example, when the user of the mobile information terminal is going to operate the mobile information terminal, while standing in a moving train, the user would hold on to a strap or a rail with one hand so that he or she will not stagger and would perform one-handed operation of the mobile information terminal with the other hand.

If an icon or link the user wants to reach is displayed in an area that is difficult to reach for the right (left) thumb on the touch sensitive screen, the user should give up the operation until the next time the train stops and operate the mobile information terminal with both hands when the train has stopped, or should release the strap or rail temporarily in the moving train and operate the mobile information terminal with both hands temporarily. If the train jolts while the user is not holding on to the strap or rail, the user may fall down. If this occurs in a crowded train, the user could bump into another passenger or could step on the foot of another passenger. The same inconvenience will occur when the user attempts to operate the mobile information terminal with one hand while carrying in the other hand a load that cannot be carried on his or her back. The user has to lower the load onto the ground and then operate the mobile information terminal.

A portable terminal in Patent Literature 1 utilizes a touch sensor (left sensor) disposed in the upper part of the left edge of the housing and a touch sensor (right sensor) disposed in the upper part of the right edge of the housing and solves the problems described above by determining whether the user's current holding state is left-handed operation, right-handed operation, or two-handed operation, using the states of thumbs detected by the left and right sensors and the detected state of the touch sensitive screen. When the detected states of the left sensor, right sensor, and touch sensitive screen are expressed by a circle (detection) or a cross (no detection), if the left and right sensors and the touch sensitive screen make no detection, for example, the state can be expressed as (left sensor, right sensor, touch sensitive screen)=(x, x, x). When the initial state S1 is defined as a state in which the user is neither gripping the portable terminal nor touching the touch sensitive screen, the initial state S1 can be expressed as (x, x, x). When a change from the initial state (x, x, x) to a state (O, x, x) is detected, it is determined that the left thumb is placed on the upper part of the left edge of the housing of the portable terminal, and the state shifts to a left-hand-holding state S2. When a change from the left-hand-holding state S2 (O, x, x) to the state (x, x, x) is detected, it is determined that the thumb is moving to touch the touch sensitive screen, and the state shifts to a prior-to-left-handed-operation state S3. When a change from the prior-to-left-handed-operation state S3 (x, x, x) to a state (x, x, O) is detected, it is determined that the thumb has touched the touch sensitive screen, and the state shifts to a subsequent-to-left-handed-operation state S4. When a change from the left-hand-holding state S2 (O, x, x) to a state (O, x, O) is detected, it is determined that the terminal is held in the left hand and the touch sensitive screen is operated with a right finger, and the state changes to a left-hand-holding right-handed-operation state S5.

The same goes for the right hand. When a change from the initial state (x, x, x) to a state (x, O, x) is detected, it is determined that the right thumb is placed on the upper part of the right edge of the housing of the portable terminal, and the state shifts to a right-hand-holding state S6. When a change from the right-hand-holding state S6 (x, O, x) to a state (x, x, x) is detected, it is determined that the thumb is moving to touch the touch sensitive screen, and the state shifts to a prior-to-right-handed-operation state S7. When a change from the prior-to-right-handed-operation state S7 (x, x, x) to a state (x, x, O) is detected, it is determined that the thumb has touched the touch sensitive screen, and the state shifts to a subsequent-to-right-handed-operation state S8. When a change from the right-hand-holding state S6 (x, O, x) to a state (x, O, O) is detected, it is determined that the terminal is held in the right hand and the touch sensitive screen is operated with a left finger, and the state shifts to a right-hand-holding left-handed-operation state S9. The terminal in Patent Literature 1 determines whether the user's current holding state is left-handed operation, right-handed operation, or two-handed operation, as described above, and repositions the control buttons on the touch sensitive screen so that they can be reached easily in any holding state.

Patent literature 1: Japanese Patent Application Laid Open No. 2009-169820

DISCLOSURE OF THE INVENTION

Problems to be Solved by the Invention

The portable terminal in Patent Literature 1, however, has the following problems in managing the user's current holding state. A first problem is that the portable terminal in Patent Literature 1 does not consider variability in the user's gripping manner among individuals. Accordingly, the portable terminal in Patent Literature 1 does not seem to increase the accuracy of determining the user's holding state above a certain level. For example, in the left-hand-holding right-handed-operation state S5, the user does not always place the left thumb on the upper part of the left edge of the housing of the portable terminal. The user may hold the portable terminal without placing the left thumb on the upper part of the left edge of the housing and may contort the thumb in such a direction that the tip of the thumb faces the user's face and may press the base of the thumb against the middle part of the left edge of the housing. If the user holds the lower part of the portable terminal, the left sensor disposed in the upper part of the left edge of the housing may not detect anything. Then, the portable terminal in Patent Literature 1 cannot determine the user's holding state correctly and cannot re-position the control buttons appropriately for each holding state.

A second problem is that a single detection state detected by the combination of the left sensor, right sensor, and touch sensitive screen represents a plurality of user's holding states, depending on the transition route. For example, the detected state (x, x, x) represents any holding state of the initial state S1, prior-to-left-handed-operation state S3, or prior-to-right-handed-operation state S7, depending on the transition route. For example, suppose that, although the portable terminal in Patent Literature 1 has determined that the detected state (x, x, x) represents the prior-to-left-handed-operation state S3, the determination is wrong, and the correct state is the prior-to-right-handed-operation state S7. Then, when the state shifts to a state (x, O, x), the portable terminal in Patent Literature 1 would misjudge the holding state after the shift is the subsequent-to-left-handed-operation state S4. In fact, since the prior-to-right-handed-operation state S7 has shifted to a state (x, x, O), the correct determination is that the state has shifted to the subsequent-to-right-handed-operation state S8. From the misjudged subsequent-to-left-handed-operation state S4, further misjudgments will be repeated in determining the subsequent states.

In the portable terminal in Patent Literature 1, if a single misjudgment is made in the process of determining the user's holding state, subsequently determined states will be all wrong. Re-positioning control buttons on the touch sensitive screen in accordance with such misjudgment would be troublesome for the user and would result in increased inconvenience to the user. Therefore, it is an object of the present invention to provide a mobile information terminal that can appropriately acquire an optimum placement area for a controllable object, regardless of the variability in user's gripping features between individuals.

Means to Solve the Problems

A mobile information terminal of the present invention includes a pressure sensor array, a gripping pressure logger, a gripping pressure change point detection unit, and a placement area acquisition section. The gripping pressure change point detection unit includes a gripping pressure change amount calculation section. The gripping pressure logger records time-series changes in gripping pressure at each pressure sensor forming the pressure sensor array. The gripping pressure change amount calculation section acquires time-series changes in gripping pressure at each pressure sensor and determines whether the amount of change in gripping pressure per unit time exceeds a predetermined value at any pressure sensor. If the amount of change in gripping pressure per unit time exceeds the predetermined value at any pressure sensor, the placement area acquisition section acquires a placement area for a controllable object with reference to a position where the amount of change in gripping pressure per unit time exceeds the predetermined value.

Effects Of The Invention

The mobile information terminal according to the present invention can appropriately acquire an optimum placement area for a controllable object, regardless of variability in user's gripping features among individuals.

BRIEF DESCRIPTION OF THE DRAWINGS

FIG. 6A to FIG. 6D are views illustrating the relationship among the positions of gripping pressure change points, screen orientation, and the operation state: Shown at FIG. 6A is left-handed operation with portrait display, with the top of the screen shown at the top edge and the bottom of the screen shown at the bottom edge; shown at FIG. 6B is right-handed operation with portrait display, with the top of the screen shown at the top edge and the bottom of the screen shown at the bottom edge; shown at FIG. 6C is left-handed operation with landscape display, with the top of the screen shown at the right edge and the bottom of the screen shown at the left edge; and shown at FIG. 6D is right-handed operation with landscape display, with the top of the screen shown at the right edge and the bottom of the screen shown at the left edge.

BEST MODES FOR CARRYING OUT THE INVENTION

Figure 1A:
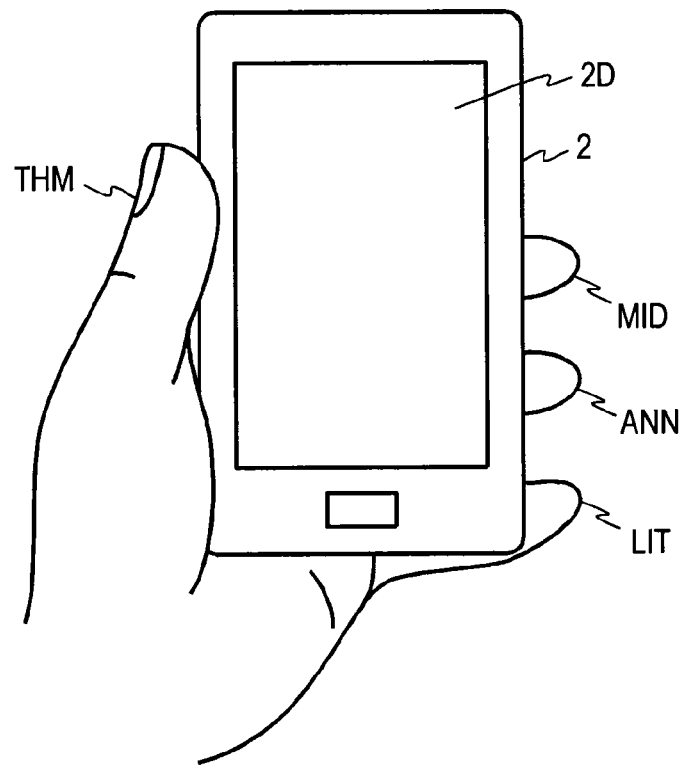
FIG. 1A is a view showing gripping features in two-handed operation with portrait display.

Now, embodiments of the present invention will be described in detail. Components having the same function are denoted by the same reference numerals, and duplicate descriptions will be omitted.

Description of Terms

Mobile Information Terminal

Specific examples of mobile information terminals include portable terminals, PDAs, portable gaming devices, electronic organizers, and electronic book readers. Besides the devices listed above, the mobile information terminal of the present invention can be any device that (1) is used in a gripped state and can acquire the gripping pressure while it is being used, (2) can be operated with one hand and with both hands, and (3) has a touch sensitive screen. In the description of embodiments, a portable terminal will be described in detail as an example.

One-handed Operation, Two-handed Operation

Using the right thumb for touch sensitive screen operation while gripping the mobile information terminal in the right hand and using the left thumb for touch sensitive screen operation while gripping the mobile information terminal in the left hand are both referred to as one-handed operation. Using left fingers for touch sensitive screen operation while gripping the mobile information terminal in the right hand and using right fingers for touch sensitive screen operation while gripping the mobile information terminal in the left hand are both referred to as two-handed operation.

Display Orientation, Screen Orientation

A display orientation is an orientation distinguished by whether the longer side of the rectangular display screen of the mobile information terminal is displayed as the vertical direction or the horizontal direction. A screen orientation is the top-to-bottom direction of the display screen of the mobile information terminal.

Portrait Display, Landscape Display

Displaying the longer side of the display screen of the mobile information terminal as the vertical direction is referred to as portrait display. Displaying the longer side of the display screen of the mobile information terminal as the horizontal direction is referred to as landscape display.

Controlling Finger

A finger that touches the touch sensitive screen of the mobile information terminal to control the mobile information terminal is referred to as a controlling finger.

Change Point

When the amount of change in gripping pressure per unit time, calculated for each pressure sensor by a gripping pressure change amount calculation section, which will be included in all the embodiments described later, exceeds a predetermined value, the position of the pressure sensor on the mobile information terminal will be referred to as a change point.

Change Frequency, Change Frequency Exceeding Point

A change frequency is the number of times counted by a change frequency counting section, which will be included in second, fourth, sixth, seventh, and eighth embodiments described later, each pressure sensor becomes a change point in a predetermined period of time. The position on the mobile information terminal of the pressure sensor at which the change frequency exceeds a predetermined frequency is referred to as a change frequency exceeding point.

Gripping Pressure Change Point

A gripping pressure change point is a general term for the change point and the change frequency exceeding point.

Controllable Object

User-controllable objects that are displayed on the display screen of the mobile information terminal are generically referred to as controllable objects. Specifically, the controllable objects include icons, links, keyboards, and the like.

[Difference in Gripping Features Between One-Handed Operation and Two-Handed Operation]

Figure 1B:
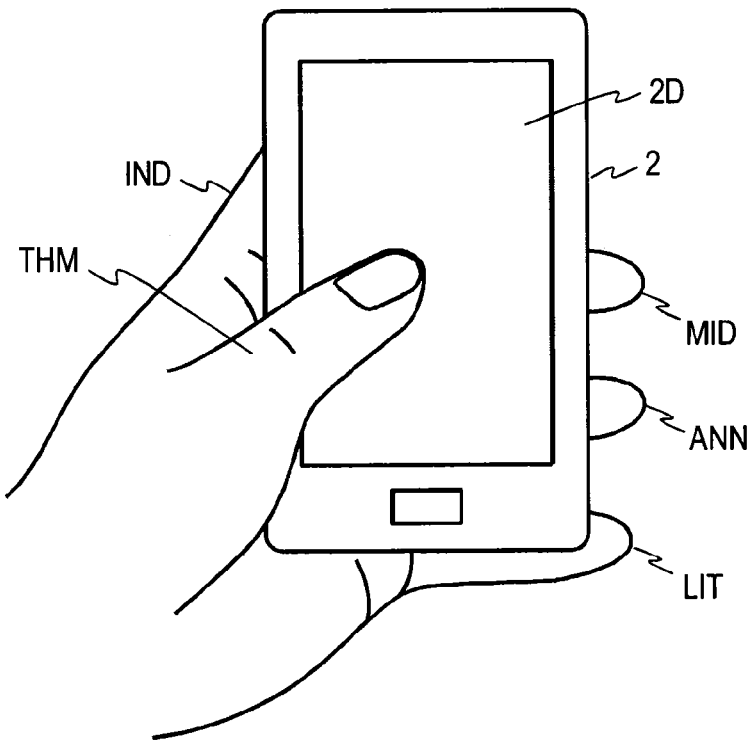
FIG. 1B is a view showing gripping features in one-handed operation with portrait display.
Figure 2A:
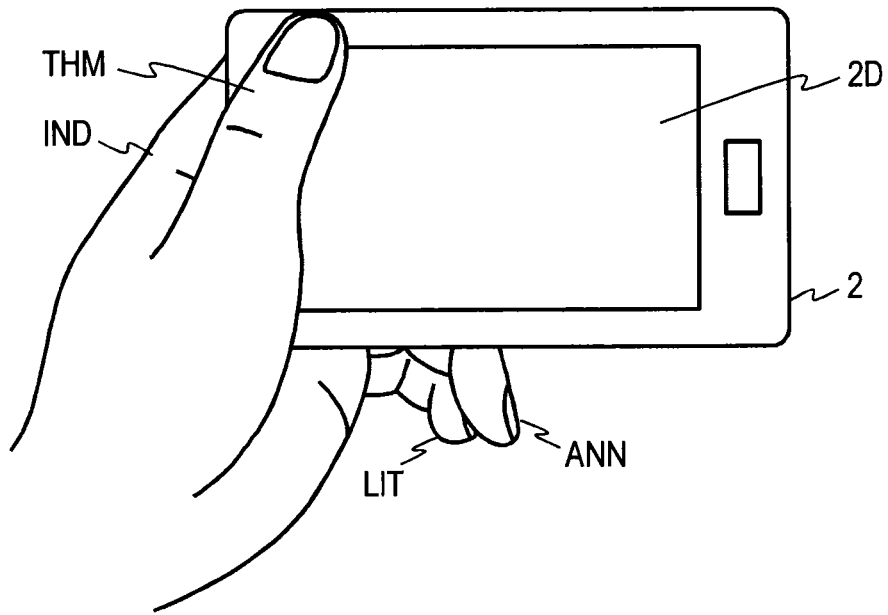
FIG. 2A is a view showing gripping features in two-handed operation with landscape display.
Figure 2B:
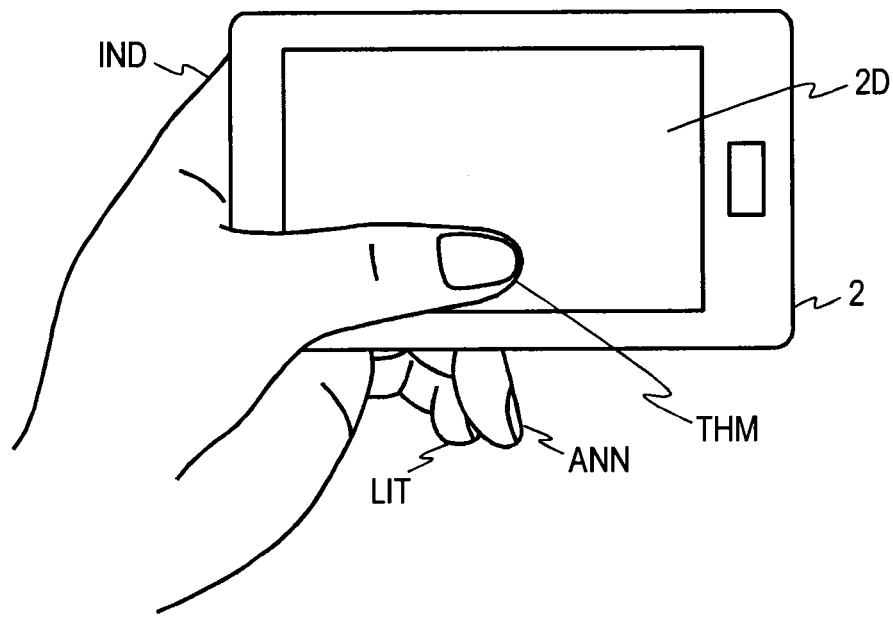
FIG. 2B is a view showing gripping features in one-handed operation with landscape display.
Figure 3A:
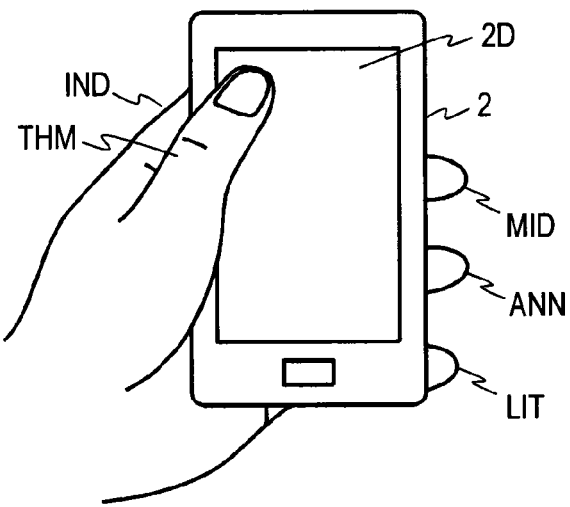
FIG. 3A is a view showing a state in which the controlling finger has been moved upward in one-handed operation.
Figure 3B:
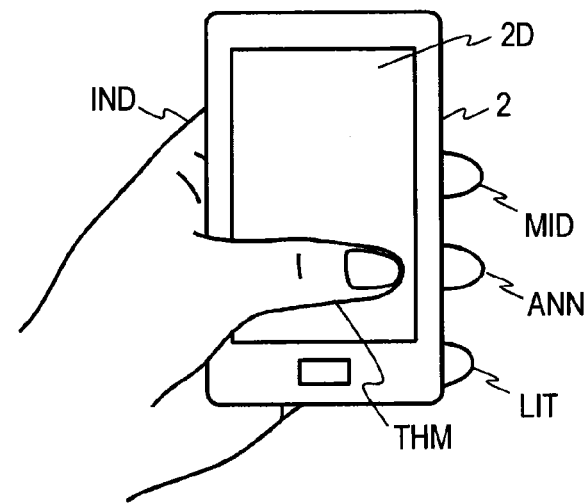
FIG. 3B is a view showing a state in which the controlling finger has been moved downward in one-handed operation.
Figure 3C:
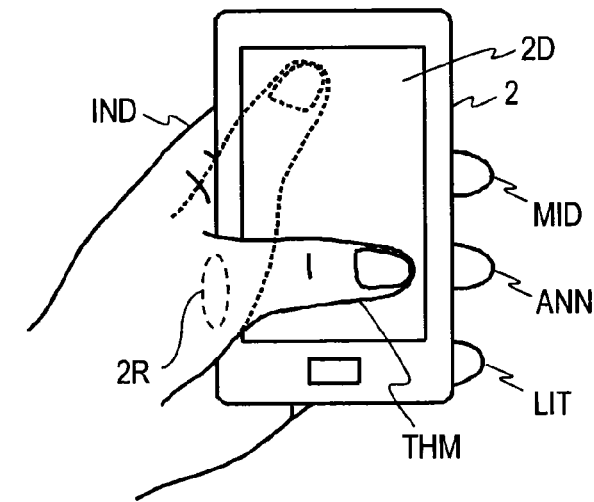
FIG. 3C is a view showing an area in which the gripping pressure changes when the controlling finger has been moved.

The mobile information terminal of the present invention is not limited to a portable terminal and can be a variety of devices, as described above. For ease of understanding, however, a portable terminal having a touch sensitive screen will be described as an example in all embodiments of the present invention. States of the user's left fingers when the user is gripping a portable terminal with a touch sensitive screen will be described with reference to FIGS. 1A, 1B, 2A, 2B, 3A, 3B, and 3C. FIGS. 1A and 1B are views comparing gripping features between one-handed operation and two-handed operation, with portrait display. A portable terminal 2 has a nearly rectangular shape, and a rectangular display screen 2D is disposed on one face. The touch sensitive screen is formed on the display screen 2D but is not shown in the figures. FIGS. 2A and 2B are views comparing gripping features between one-handed operation and two-handed operation, with landscape display. FIGS. 3A, 3B, and 3C are views illustrating a change in gripping pressure in one-handed operation. FIG. 1A shows the state of the left hand when portrait display, left-hand gripping, and right-handed operation are performed. FIG. 1B shows the state of the left hand when portrait display, left-hand gripping, and left-handed operation are performed.

Comparison between FIGS. 1A and 1B indicates that the gripping positions of the left index finger IND, middle finger MID, ring finger ANN, and little finger LIT do not differ greatly, but the position of the thumb differs greatly. When portrait display, left-hand gripping, and right-handed operation are performed, as shown in FIG. 1A, the user's left thumb THM rests in a position outside the display screen 2D, so that operation with a right finger will not be disturbed and the user can see the display screen 2D easily. In contrast, when portrait display, left-hand gripping, and left-handed operation are performed, as shown in FIG. 1B, the user's left thumb THM stands ready to touch a user-desired controllable object above the middle of the touch sensitive screen 2D. The same goes for the landscape display (FIG. 2A shows the state of the left hand when landscape display, left-hand gripping, and right-handed operation are performed, and FIG. 2B shows the state of the left hand when landscape display, left-hand gripping, and left-handed operation are performed).

Features that are not found in two-handed operation can be seen in one-handed operation. FIG. 3A is a view showing the limit of a counterclockwise movable range of the controlling finger (left thumb THM) when portrait display, left-hand gripping, and left-handed operation are performed. FIG. 3B is a view showing the limit of a clockwise movable range of the controlling finger (left thumb THM) when portrait display, left-hand gripping, and left-handed operation are performed. Both FIGS. 3A and 3B show ranges where the user can move the left thumb easily as movable ranges. When the user can move the controlling finger (left thumb THM) as shown in FIGS. 3A and 3B, the tip of the controlling finger (left thumb THM) forms a circular locus around the point of contact between the base of the thumb and the edge of the portable terminal 2, as shown in FIG. 3C. The gripping pressure in the vicinity of the point of contact between the base of the left thumb and the edge of the portable terminal 2 (an elliptical area 2R enclosed by a broken line in FIG. 3C) varies from moment to moment while the controlling finger (left thumb THM) is contorting and touching the screen.

On the other hand, as indicated by FIGS. 1A and 2A, in two-handed operation, the gripping pressure does not change greatly in any areas of the portable terminal 2, including the elliptical area 2R enclosed by a broken line in FIG. 3C. Accordingly, if a change in gripping pressure exceeding a predetermined value occurs in any area on the edges of the portable terminal 2, it can be determined that the user is in the one-handed-operation state; and if a change in gripping pressure exceeding the predetermined value does not occur in any area on the edges of the portable terminal 2, it can be determined that the user is in the two-handed-operation state. If the number of times changes in gripping pressure occur (change frequency) is large in any area on the edges of the portable terminal 2 in a predetermined period of time, it may be determined that the user is in the one-handed-operation state; and if the change frequency is small in any area of the edges of the portable terminal 2 in the predetermined period of time, it may be determined that the user is in the two-handed-operation state. According to the present invention, on the basis of the above-described points, an optimum placement area can be acquired for a controllable object, the optimum placement area varying depending on whether the user is in the one-handed-operation state or the two-handed-operation state.

Pressure Sensor Array 11

Figure 4:
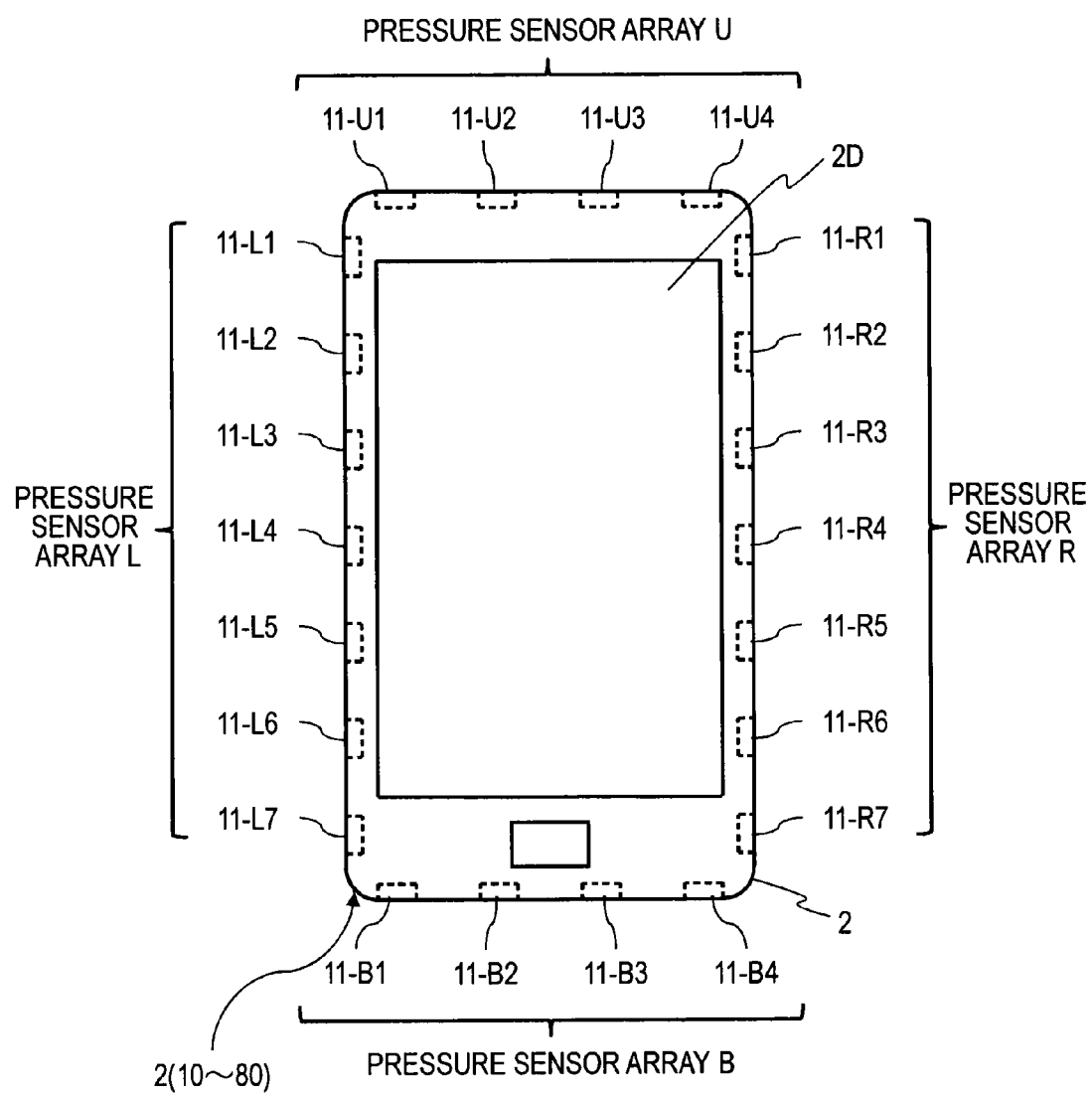
FIG. 4 is a view showing examples of pressure sensor arrays included in the portable terminals according to all embodiments.

A pressure sensor array 11 included in portable terminals 10, 20, 30, 40, 50, 60, 70 and 80 in all embodiments of the present invention, shown in FIGS. 12, 14, 16, 18, 20, 22, 24, 26, will be described next with reference to FIG. 4. FIG. 4 is a view showing an example of the pressure sensor array 11 included in the portable terminals 10, 20, 30, 40, 50, 60, 70 and 80 (represented by the portable terminal 2) in all the embodiments. FIG. 4 shows just an example and does not confine the position of the pressure sensor array 11 used in the present invention. However, since the pressure sensor array 11 used in the present invention needs to measure changes in gripping pressure at the position of contact between the base of the controlling finger (thumb) and an edge of the portable terminal 2 in one-handed operation, it is desirable that individual sensors be disposed at regular intervals at all edges of the portable terminal 2. In the example shown in FIG. 4, for example, the pressure sensor array 11 included in the portable terminal 2 includes a pressure sensor array U disposed on the upper edge of the portable terminal 2, a pressure sensor array L disposed on the left edge of the portable terminal 2, a pressure sensor array R disposed on the right edge of the portable terminal 2, and a pressure sensor array B disposed on the bottom edge of the portable terminal 2. The pressure sensor array U includes four pressure sensors 11-U1, 11-U2, 11-U3, and 11-U4. The pressure sensor array L includes seven pressure sensors 11-L1, 11-L2, 11-L3, 11-L4, 11-L5, 11-L6, and 11-L7. The pressure sensor array R includes seven pressure sensors 11-R1, 11-R2, 11-R3, 11-R4, 11-R5, 11-R6, and 11-R7. The pressure sensor array B includes four pressure sensors 11-B1, 11-B2, 11-B3, and 11-B4. Since the portable terminal 2 includes the pressure sensor array 11 in this manner, when the gripping pressure changes greatly in the elliptical area 2R enclosed by a broken line in FIG. 3C, described earlier, changes in gripping pressure can be observed by the pressure sensors 11-L5, 11-L6, and the like. In one-handed operation with right-hand gripping and right-handed operation, for example, changes in gripping pressure are observed by the pressure sensors 11-R5, 11-R6, and the like.

Operation of Gripping Pressure Logger 12

A gripping pressure logger 12 included in the portable terminals 10, 20, 30, 40, 50, 60, 70 and 80 (represented by the portable terminal 2) in all the embodiments of the present invention, shown in FIGS. 12, 14, 16, 18, 20, 22, 24, and 26, will be described next. The gripping pressure logger 12 records values observed by all the pressure sensors (11-U1 to 11-U4, 11-L1 to 11-L7, 11-R1 to 11-R7, and 11-B1 to 11-B4) included in the pressure sensor array 11 as time-series data at each pressure sensor for use in determining the operation state, which will be described later.

Operation of Gripping Pressure Change Amount Calculation Section 13a

A gripping pressure change amount calculation section 13a included in the portable terminals 10, 20, 30, 40, 50, 60, 70 and 80 (represented by the portable terminal 2) in all the embodiments of the present invention, shown in FIGS. 12, 14, 16, 18, 20, 22, 24, and 26, will be described next. One of the easiest ways of distinguishing between one-handed operation and two-handed operation from the time-series data of gripping pressure at each pressure sensor, recorded by the gripping pressure logger 12, described above, is to determine whether an abrupt change in gripping pressure occurs at any pressure sensor. The gripping pressure change amount calculation section 13a is a component for detecting an abrupt change in gripping pressure. More specifically, the gripping pressure change amount calculation section 13a acquires time-series changes in gripping pressure at each sensor from the gripping pressure logger 12 and determines whether the amount of change in gripping pressure per unit time at each pressure sensor exceeds a predetermined value. The first derivative of the time-series data of gripping pressure can be used as the amount of change in gripping pressure per unit time.

Operation of Change Frequency Counting Section 23b

A change frequency counting section 23b included in the portable terminals 20, 40, 60, and 80 (represented by the portable terminal 2) in second, fourth, sixth, and eighth embodiments of the present invention, shown in FIGS. 14, 18, 22, and 26, will be described next. One method of distinguishing between one-handed operation and two-handed operation from the time-series data of gripping pressure recorded by the gripping pressure logger 12 at each pressure sensor can be based on the number of abrupt changes in gripping pressure observed at the pressure sensor in a predetermined period of time. The change frequency counting section 23b is a component for counting the number of abrupt changes in gripping pressure in the predetermined period of time. More specifically, the change frequency counting section 23b counts the number of times the amount of change in gripping pressure per unit time exceeds a predetermined value in each predetermined period of time.

Determination Operation of Placement Area Acquisition Section 51 or 61

Figure 5A:
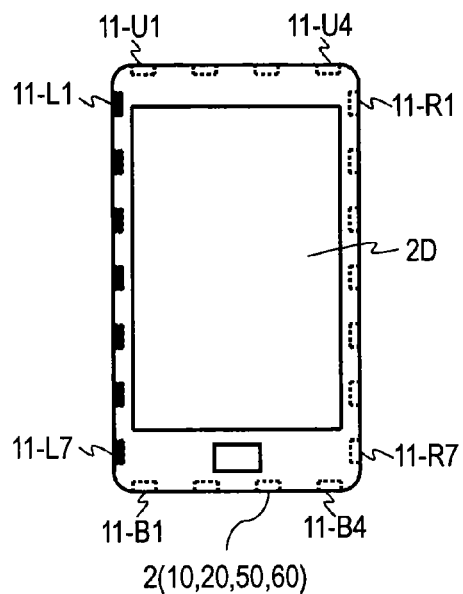
FIG. 5A to FIG. 5D are views illustrating the relationship between the positions of gripping pressure change points and the operation state: Shown at FIG. 5A is left-handed operation with portrait display; shown at FIG. 5B is right-handed operation with portrait display; shown at FIG. 5C is left-handed operation with landscape display; and shown at FIG. 5D is right-handed operation with landscape display.
Figure 5B:
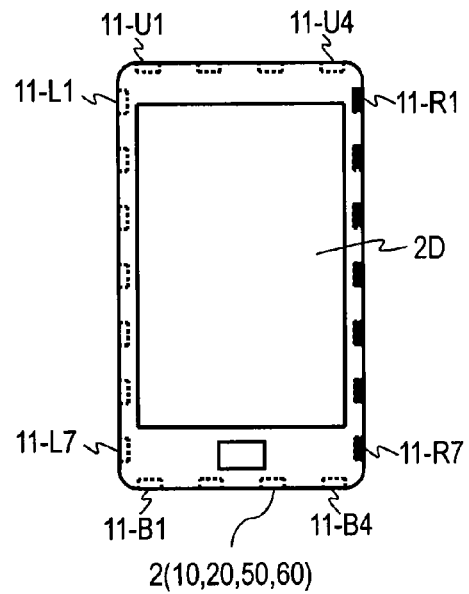
Figure 5C:
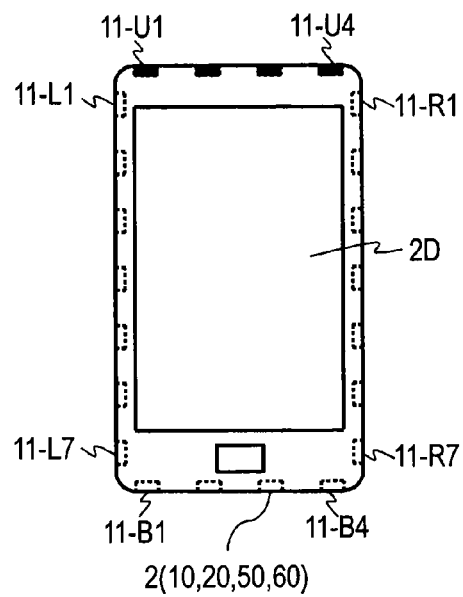
Figure 5D:
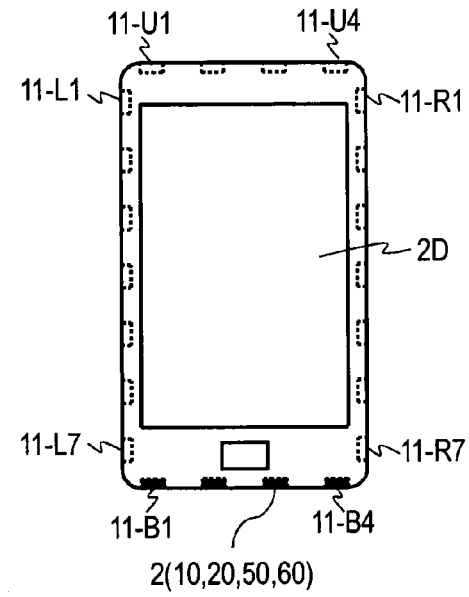

The operation principle of a placement area acquisition section 51 or 61 included in the portable terminals 10, 20, 50, and 60 (represented by the portable terminal 2) in first, second, fifth, and sixth embodiments, shown in FIGS. 12, 14, 20, and 22, will be described next with reference to FIGS. 5A to 5D. FIGS. 5A to 5D are views illustrating the relationship between the position of a gripping pressure change point 2G and the operation state. Black rectangles in FIGS. 5A and 5B represent pressure sensors that can observe a change in gripping pressure in one-handed operation when the display orientation of the display screen 2D is portrait display. Black rectangles in FIGS. 5C and 5D represent pressure sensors that can observe a change in gripping pressure in one-handed operation when the display orientation is landscape display. For example, the black rectangles in FIG. 5A represent the seven left pressure sensors (11-L1 to 11-L7), and the black rectangles in FIG. 5B represent the seven right pressure sensors (11-R1 to 11-R7). At first sight, among the pressure sensors represented by the black rectangles, the pressure sensors 11-L1 and 11-L2, for example, seem to be so high that the base of the controlling finger, that is, the thumb THM, will not touch them. However, when the user is using the portable terminal 2 with the screen orientation upside down (with the top of the screen displayed at the bottom of the figure) and when right-hand gripping and right-handed operation are performed, the pressure sensors 11-L1, 11-L2, and the like can touch the base of the controlling finger, that is, the right thumb THM. In the same way, when the user is using the portable terminal 2 with the screen orientation upside down (with the top of the screen displayed at the bottom of the figure) and when left-hand gripping and left-handed operation are performed, the pressure sensors 11-R1, 11-R2, and the like can touch the base of the controlling finger, that is, the left thumb THM. The same goes for landscape display shown in FIGS. 5C and 5D.

As described above, when the user is performing one-handed operation, a change in gripping pressure is always observed by some of the pressure sensors on the top, bottom, right, and left edges of the portable terminal 2. In contrast, when the user is performing two-handed operation, no change in gripping pressure is observed by any of the pressure sensors on the top, bottom, right, and left edges of the portable terminal 2. The placement area acquisition section 51 or 61 included in the portable terminals 10, 20, 50, and 60 (FIGS. 12, 14, 20, and 22) in the first, second, fifth, and sixth embodiments determines whether an amount of change in gripping pressure per unit time exceeds the predetermined value at any of the pressure sensors on the top, bottom, right, and left edges, that is, whether a gripping pressure change point exists. The placement area acquisition section 51 or 61 specifies an optimum placement area according to the position of the gripping pressure change point when the amount of change exceeds the predetermined value (or for a period of time for which the change frequency exceeds the predetermined value). The placement area acquisition section 51 or 61 determines that the operation state is two-handed operation and does not execute the subsequent processes when there is no gripping pressure change point at any of the pressure sensors on the top, bottom, right, and left edges.

Determination Operation of Placement Area Acquisition Section 71 or 81

The determination operation of a placement area acquisition section 71 or 81 included in the portable terminals 30, 40, 70, and 80 (represented by the portable terminal 2) in third, fourth, seventh, and eighth embodiments, shown in FIGS. 16, 18, 24, and 26, will be described next with reference to FIGS. 6A to 6D. FIGS. 6A to 6D are views illustrating the relationship among the position of a gripping pressure change point, the screen orientation, and the operation state. Black rectangles in FIG. 6A represent pressure sensors that can observe a change in gripping pressure in a state of left-hand gripping and left-handed operation when the display orientation of the display screen 2D is portrait display with the top of the screen displayed at the top of the figure. Black rectangles in FIG. 6B represent pressure sensors that can observe a change in gripping pressure in a state of right-hand gripping and right-handed operation when the display orientation is portrait display with the top of the screen displayed at the top of the figure. Black rectangles in FIG. 6C represent pressure sensors that can observe a change in gripping pressure in a state of left-hand gripping and left-handed operation when the display orientation is landscape display with the top of the screen displayed to the right of the figure. Black rectangles in FIG. 6D represent pressure sensors that can observe a change in gripping pressure in a state of right-hand gripping and right-handed operation when the display orientation is landscape display with the top of the screen displayed to the right of the figure. As described earlier, when the user is performing two-handed operation, none of the pressure sensors on the top, bottom, right, and left edges of the portable terminal 2 observe a change in gripping pressure.

When the screen orientation (top-to-bottom direction) is known and when an edge that includes the position of the pressure sensor that has observed a change in gripping pressure (gripping pressure change point) is identified, as described above, the placement area acquisition section 71 or 81 in the portable terminal 30, 40, 70, or 80 (FIG. 16, 18, 24, or 26) determines whether the user's operation state is one-handed or two-handed operation, in accordance with the two information items (the top-to-bottom direction and the position of the gripping pressure change point), and can further determine an optimum placement area according to the position of the gripping pressure change point and also according to, in one-handed operation, whether it is left-hand gripping and left-handed operation or right-hand gripping and right-handed operation. More specifically, when the gripping pressure change point is on the right edge of the portable terminal 30, 40, 70, or 80 with reference to the screen orientation (top-to-bottom direction), the placement area acquisition section 71 or 81 included in the portable terminal 30, 40, 70, or 80 determines that the operation state is right-hand gripping and right-handed operation and specifies an optimum placement area according to the position of the gripping pressure change point. When the gripping pressure change point is on the left edge of the portable terminal 30, 40, 70, or 80 with reference to the screen orientation (top-to-bottom direction), the placement area acquisition section 71 or 81 determines that the operation state is left-hand gripping and left-handed operation and specifies an optimum placement area according to the position of the gripping pressure change point. When the gripping pressure change point is not found on any edge of the portable terminal 30, 40, 70, or 80, the operation state is determined to be two-handed operation, and the subsequent processes are not executed.

Operation of Specifying Optimum Placement Area in Placement Area Acquisition Section 51

Figure 7A:
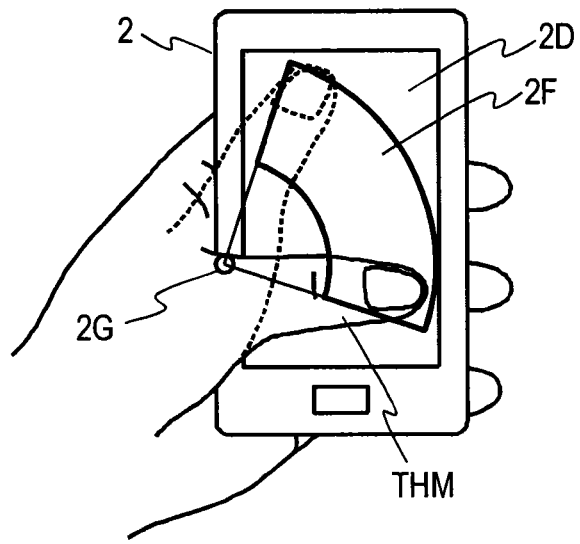
FIG. 7A is a view showing an example of a controlling-finger movement range in left-handed operation when the screen orientation is unknown.
Figure 7B:
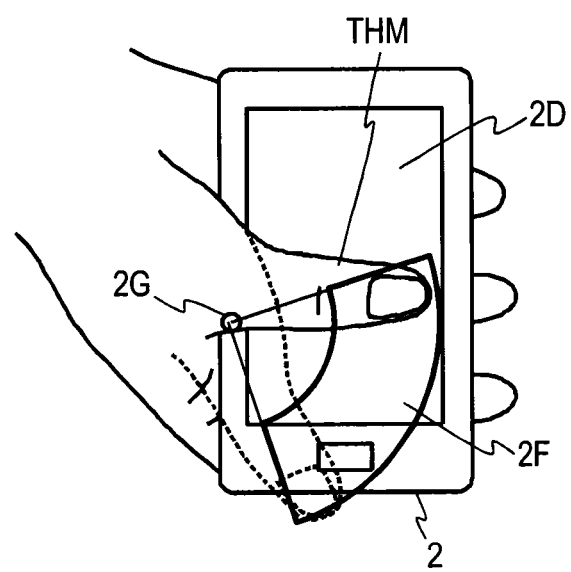
FIG. 7B is a view showing an example of a controlling-finger movement range in right-handed operation when the screen orientation is unknown.
Figure 7C:
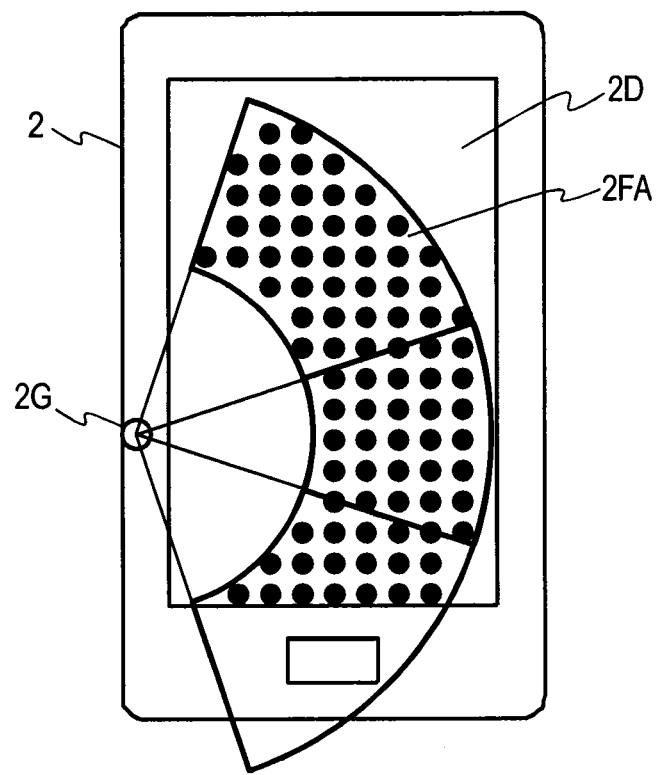
FIG. 7C is a view showing an optimum placement area obtained by superimposing the controlling-finger movement ranges shown in FIGS. 7A and 7B.
Figure 12:
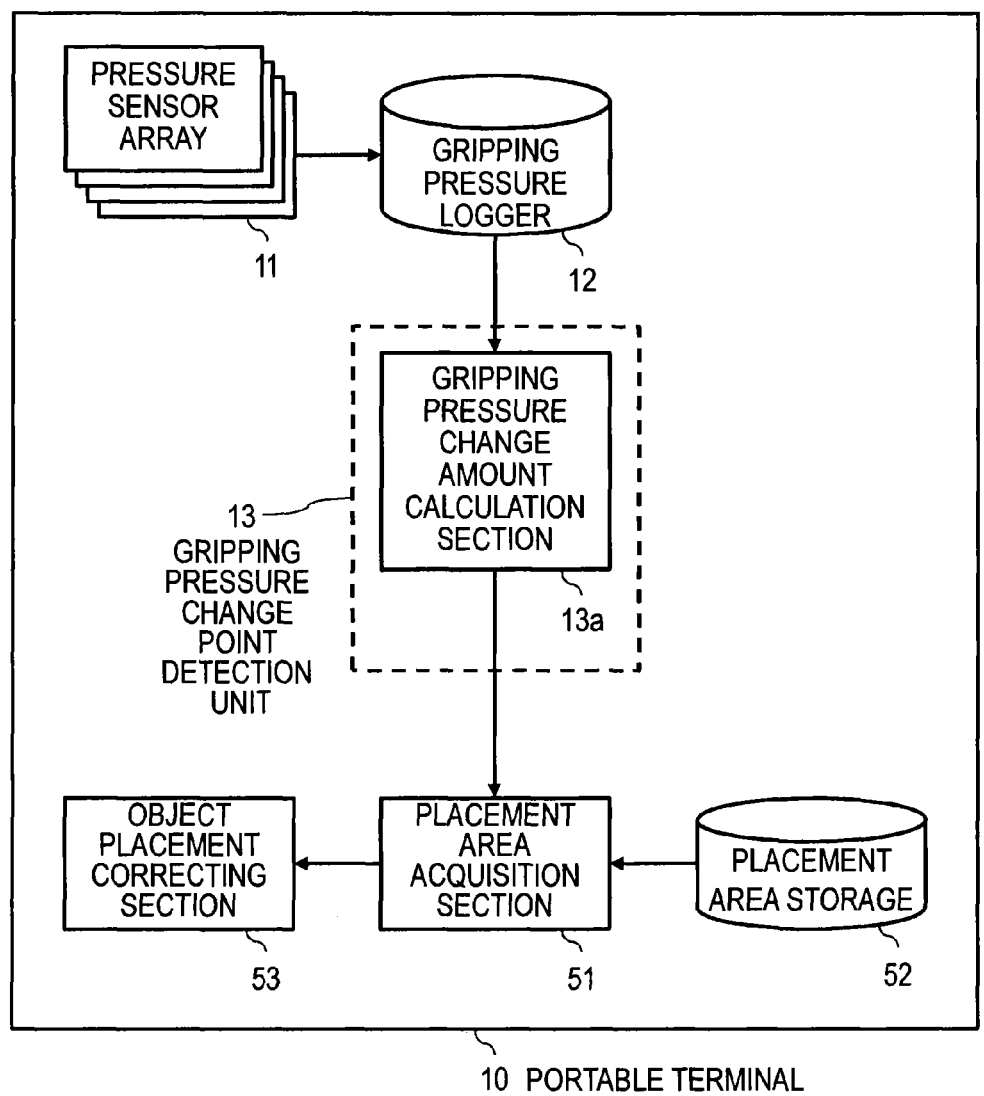
FIG. 12 is a block diagram showing the configuration of a portable terminal according to a first embodiment.
Figure 14:
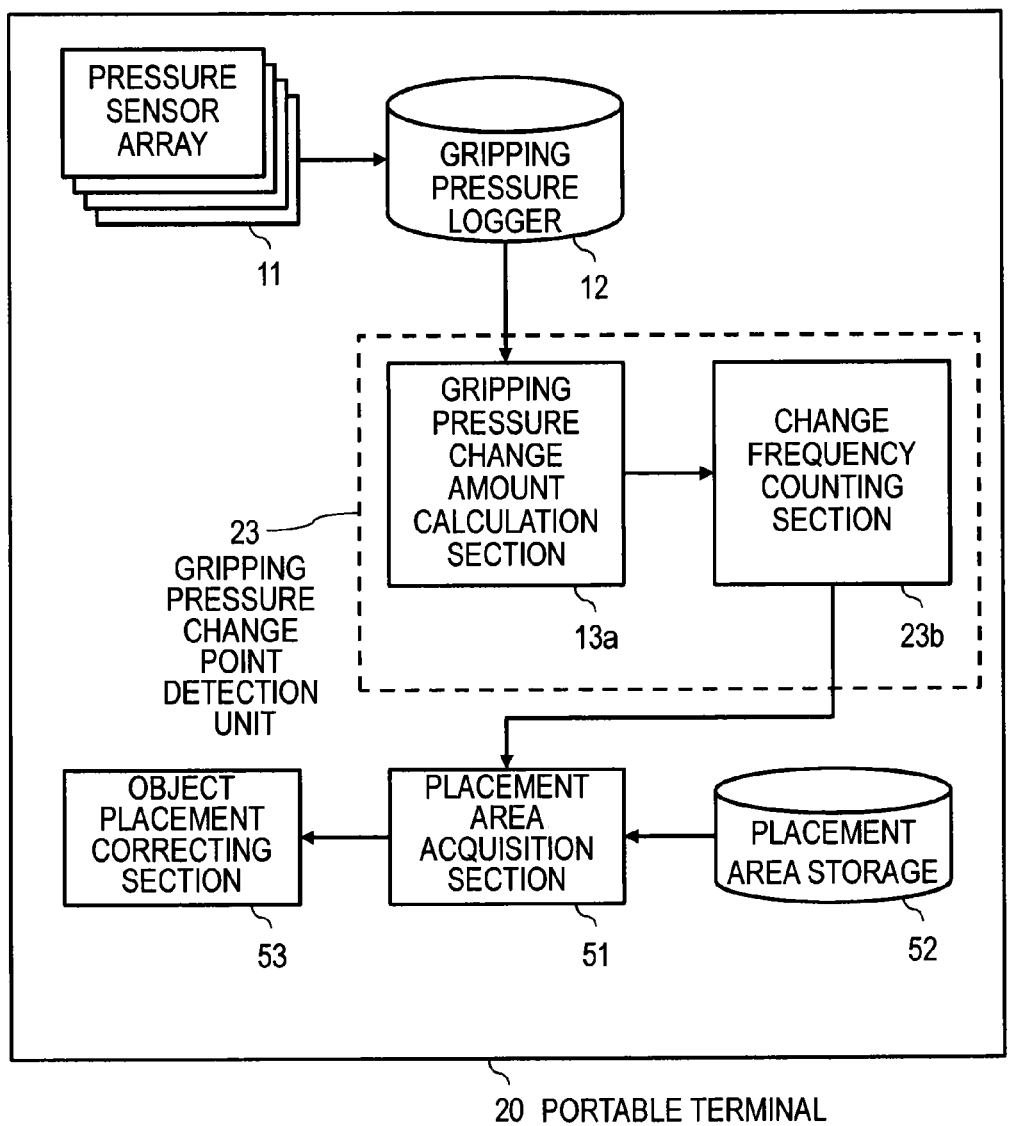
FIG. 14 is a block diagram showing the configuration of a portable terminal according to a second embodiment.

The operation of specifying an optimum placement area in the placement area acquisition section 51 included in the portable terminal 10 or 20 (represented by the portable terminal 2) in the first or second embodiment, shown in FIG. 12 or 14, will be described next with reference to FIGS. 7A, 7B, and 7C. FIGS. 7A, 7B, and 7C are views showing examples of the placement area determined from a gripping pressure change point when the screen orientation (top-to-bottom direction) is not known. FIG. 7A is a view showing an example of controllable range 2F for the controlling finger (left thumb THM) in left-hand gripping and left-handed operation. The controllable range 2F can be obtained by using the gripping pressure change point 2G as a reference point. For example, the controllable range 2F can be set as a fan-shaped area having a given width that is predetermined such that the controlling finger can easily touch the screen, within the counterclockwise and clockwise movable angle ranges of the controlling finger around the gripping pressure change point 2G. The movable angle of the thumb THM is roughly 90°, with some variability between individuals. The radial width of the fan-shaped area should be set to an appropriate width such that an area that can be touched by small-handed people and an area that can be touched by large-handed people overlap, with variability in finger length among individuals taken into consideration.

FIG. 7B shows an example in which the gripping pressure change point 2G appears at the same position as shown in FIG. 7A, the user uses the terminal upside down (with the top of the screen shown at the bottom of the figure), and right-hand gripping and right-handed operation are performed. Although the gripping pressure change point 2G appears at the same position as shown in FIG. 7A, a controllable range 2F that can be obtained by using the gripping pressure change point 2G as a reference point differs from that shown in FIG. 7A. Whether the relationship between the gripping pressure change point 2G and the controllable range 2F obtained therefrom becomes the positional relationship shown in FIG. 7A or the positional relationship shown in FIG. 7B depends on the known screen orientation (top-to-bottom direction). If the function to determine the top-to-bottom direction is not provided, as in the portable terminal 50 or 60, however, the range represented by polka dots shown in FIG. 7C, including the standard controllable range 2F determined as shown in FIG. 7A and the standard controllable range 2F determined as shown in FIG. 7B, is set as a placement area 2FA. The relative position of the gripping pressure change point with respect to the standard placement area is fixed. The placement area is stored in a placement area storage 52, together with the relative position information thereof with respect to the gripping pressure change point before the portable terminal is shipped. The relative position information may be the coordinates of the center of gravity of the placement area and the coordinates of the gripping pressure change point or may also be the distance and angle between these two sets of coordinates on the coordinate system. If the position of the gripping pressure change point is acquired before the portable terminal has ever been used, even though the screen orientation (top-to-bottom direction) of the display screen 2D is not known, an optimum placement area can be set by moving the placement area stored in the placement area storage 52 with respect to the acquired gripping pressure change point in accordance with the relative position information. The portable terminals 10 and 20 in the first and second embodiments do not have a screen orientation acquisition section 31 and do not acquire the screen orientation (top-to-bottom direction) beforehand, which will be described later in detail. Accordingly, the placement area acquisition section 51 of the portable terminals 10 and 20 in the first and second embodiments specifies an optimum placement area by moving the placement area 2FA, represented by polka dots in FIG. 7C, in accordance with the gripping pressure change point 2G.

Operation of Specifying Optimum Placement Area in Placement Area Acquisition Section 71

Figure 8A:
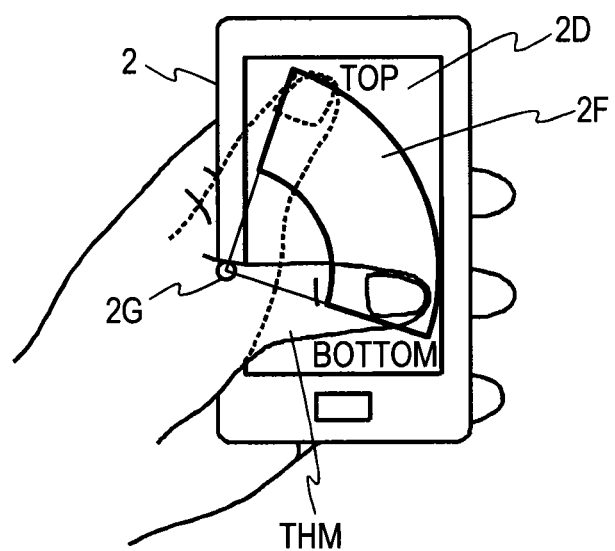
FIG. 8A is a view showing an example of a controlling-finger movement range in left-handed operation when the screen orientation is known.
Figure 8B:
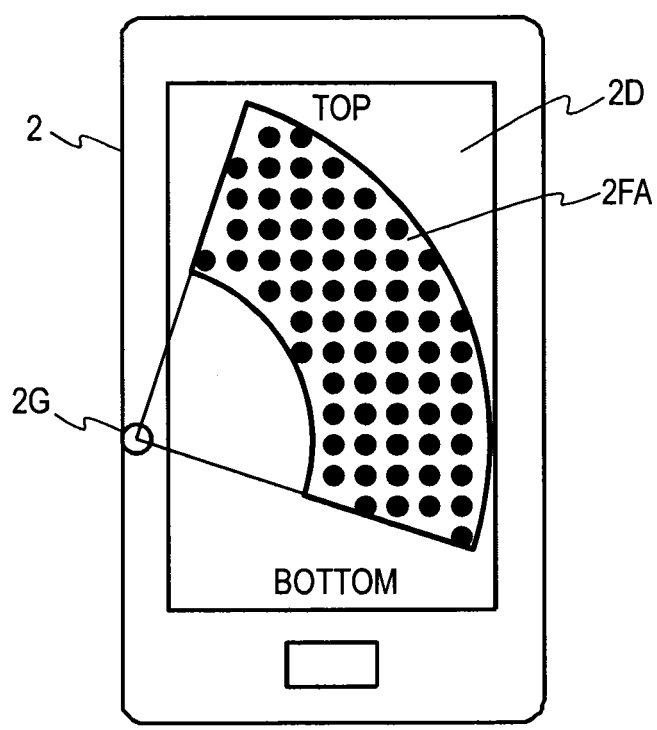
FIG. 8B is a view showing an optimum placement area obtained from the controlling-finger movement range shown in FIG. 8A.
Figure 9A:
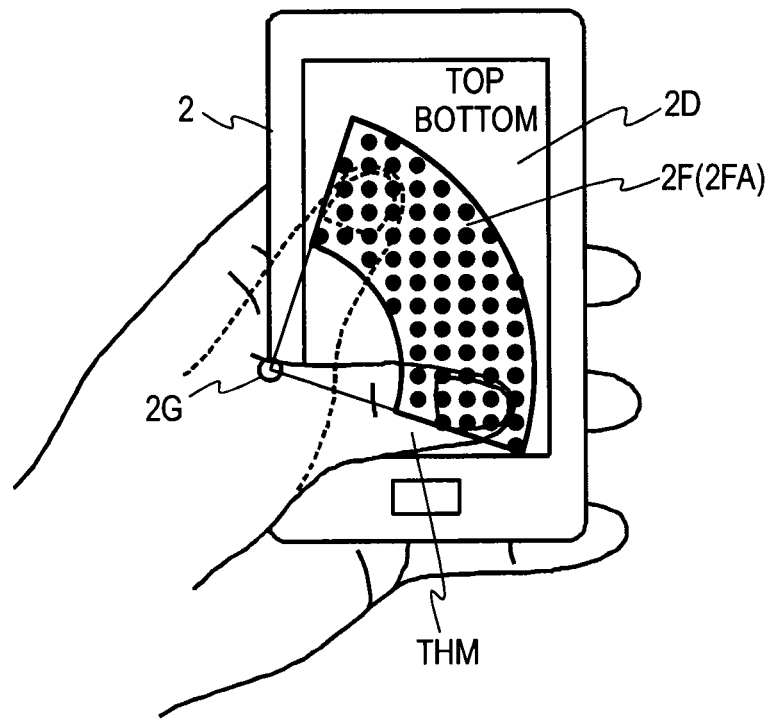
FIG. 9A is a view showing an example of an optimum placement area when the gripping pressure change point is in a comparatively lower part.
Figure 9B:
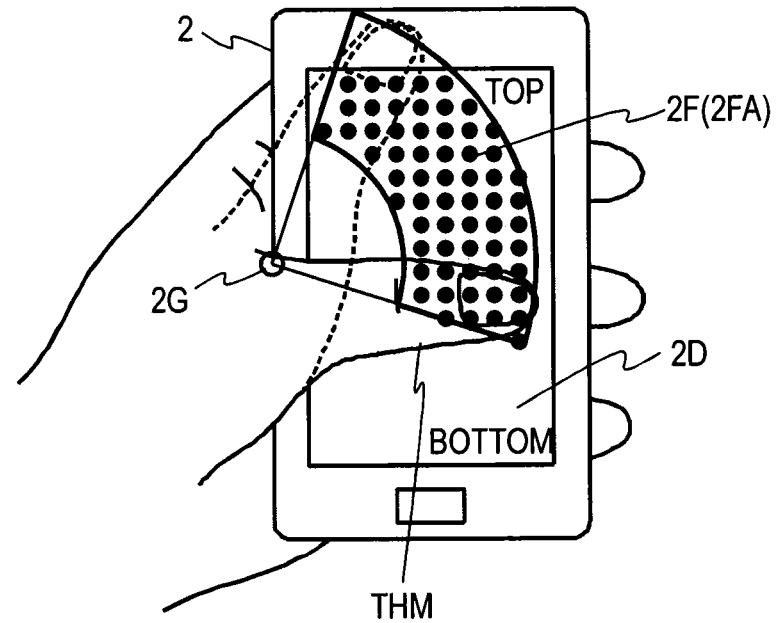
FIG. 9B is a view showing an example of an optimum placement area when the gripping pressure change point is in a comparatively higher part.
Figure 16:
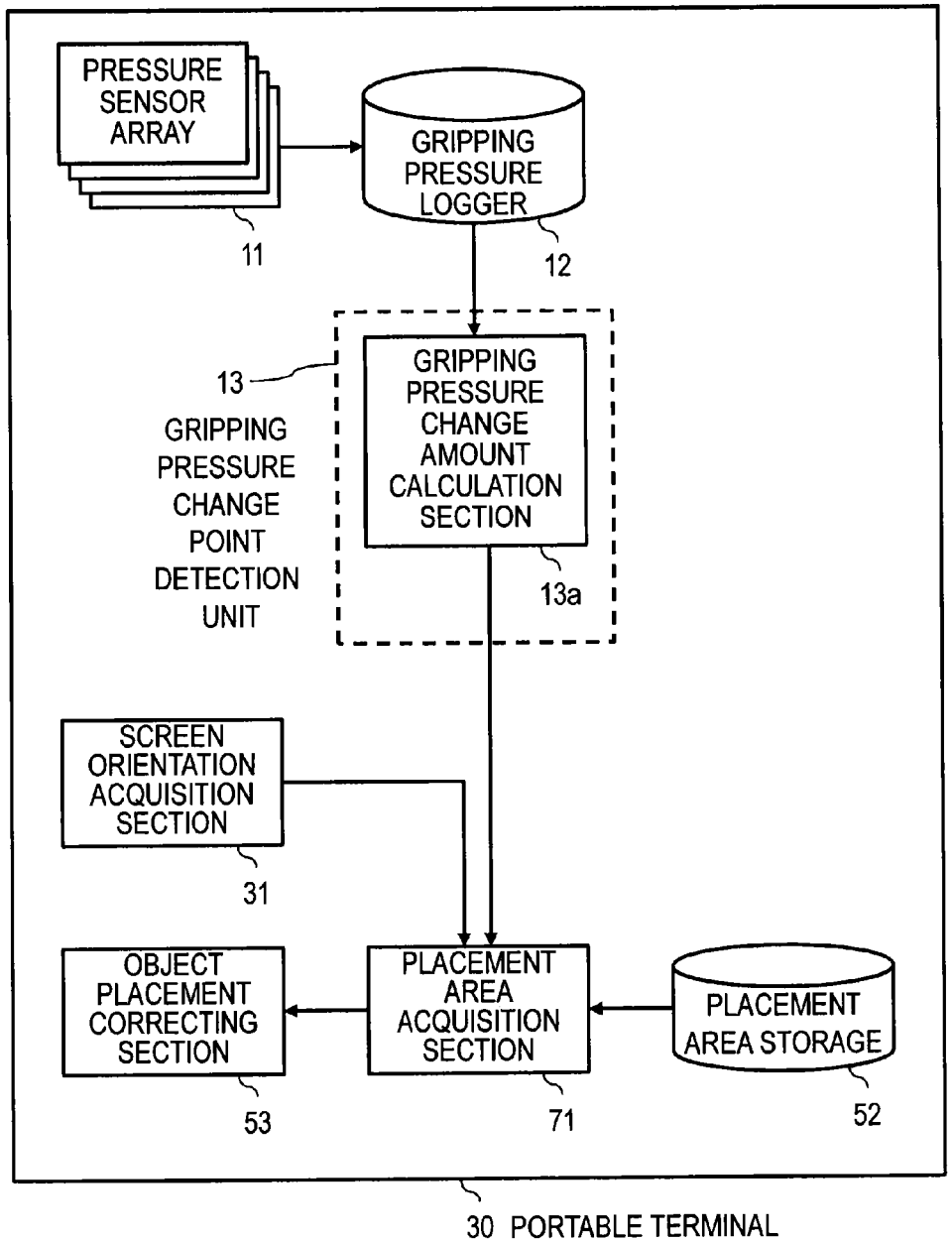
FIG. 16 is a block diagram showing the configuration of a portable terminal according to a third embodiment.
Figure 18:
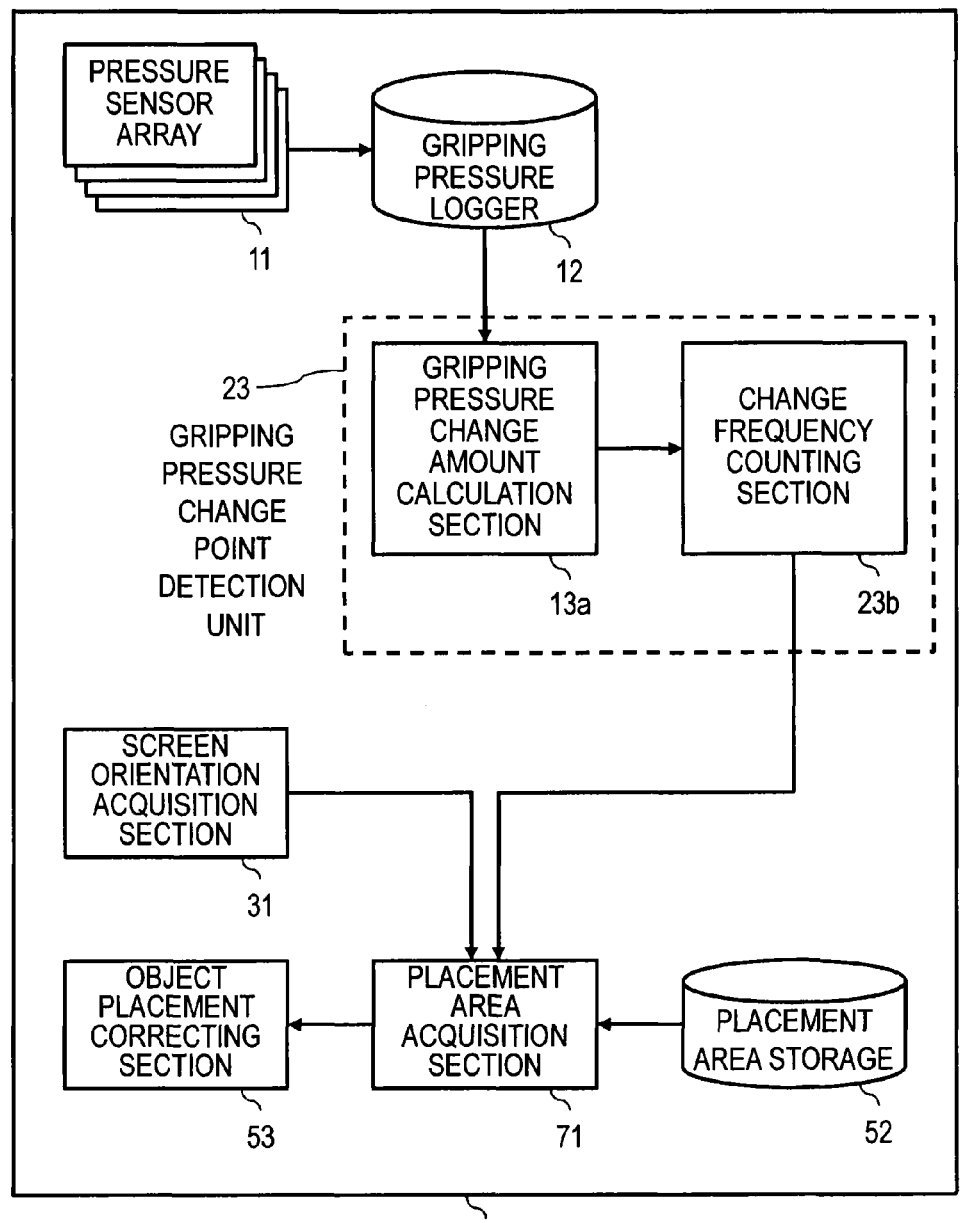
FIG. 18 is a block diagram showing the configuration of a portable terminal according to a fourth embodiment.

The operation of specifying an optimum placement area in the placement area acquisition section 71 included in the portable terminals 30 and 40 in the third and fourth embodiments shown in FIG. 16 and FIG. 18 will be described next with reference to FIGS. 8A, 8B, 9A, and 9B. FIGS. 8A and 8B are views showing an example of a placement area determined from a gripping pressure change point when the screen orientation (top-to-bottom direction) is known. FIGS. 9A and 9B are views showing an example of a change in the placement area, depending on the gripping pressure change point. FIG. 8A is a view showing an example of the controllable range 2F of the controlling finger (left thumb THM) in left-hand gripping and left-handed operation. The controllable range 2F can be obtained with reference to the gripping pressure change point 2G, as described above. The controllable range 2F can be set as a fan-shaped area having a predetermined width such that the controlling finger can easily touch the screen, within the counterclockwise and clockwise movable angles of the controlling finger around the gripping pressure change point 2G.

Since the screen orientation (top-to-bottom direction) is known for FIGS. 8A and 8B, the controllable range 2F obtained in FIG. 8A is directly set as the placement area 2FA beforehand, like the area represented by polka dots in FIG. 8B, and is stored in the placement area storage 52 together with the relative position information thereof with respect to the gripping pressure change point 2G. The portable terminals 30 and 40 in the third and fourth embodiments include the screen orientation acquisition section 31, and the screen orientation acquisition section 31 can acquire the screen orientation (top-to-bottom direction), which will be described later in detail. Accordingly, the placement area acquisition section 71 of the portable terminals 30 and 40 in the third and fourth embodiments specifies the optimum placement area 2FA, represented by polka dots, in accordance with the screen orientation (top-to-bottom direction) and the gripping pressure change point 2G. Of course, since the relative positional relationship between the position of the gripping pressure change point 2G and the controllable range 2F (placement area 2FA) is fixed, as shown in FIGS. 9A and 9B, a vertical movement of the gripping pressure change point 2G moves the controllable range 2F (placement area 2FA) vertically. This goes for FIGS. 7A, 7B, and 7C, as described earlier, and a vertical movement of the griping pressure change point 2G moves the placement area 2FA shown in FIG. 7C vertically.

Operation Principle of Placement Area Acquisition Section 81

Figure 10A:
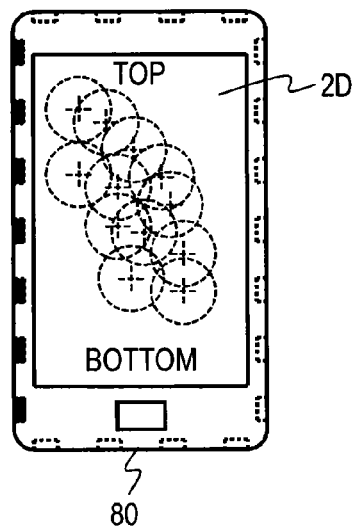
FIG. 10A to FIG. 10D are views showing examples of a log recorded by a touch-sensitive-screen logger: Shown at FIG. 10A is a log of left-handed operation with portrait display; shown at FIG. 10B is a log of right-handed operation with portrait display; shown at FIG. 10C is a log of left-handed operation with landscape display; shown at FIG. 10D is a log of right-handed operation with landscape display.
Figure 10B:
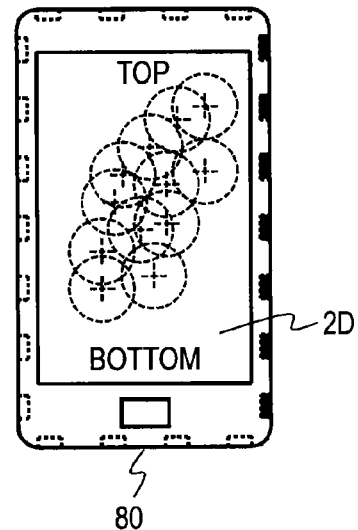
Figure 10C:
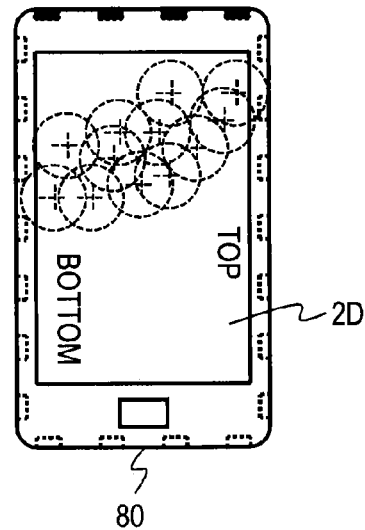
Figure 10D:
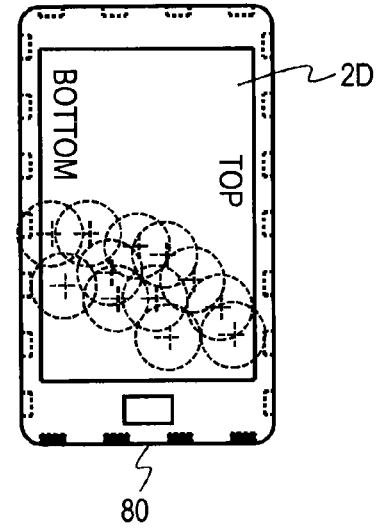
Figure 24:
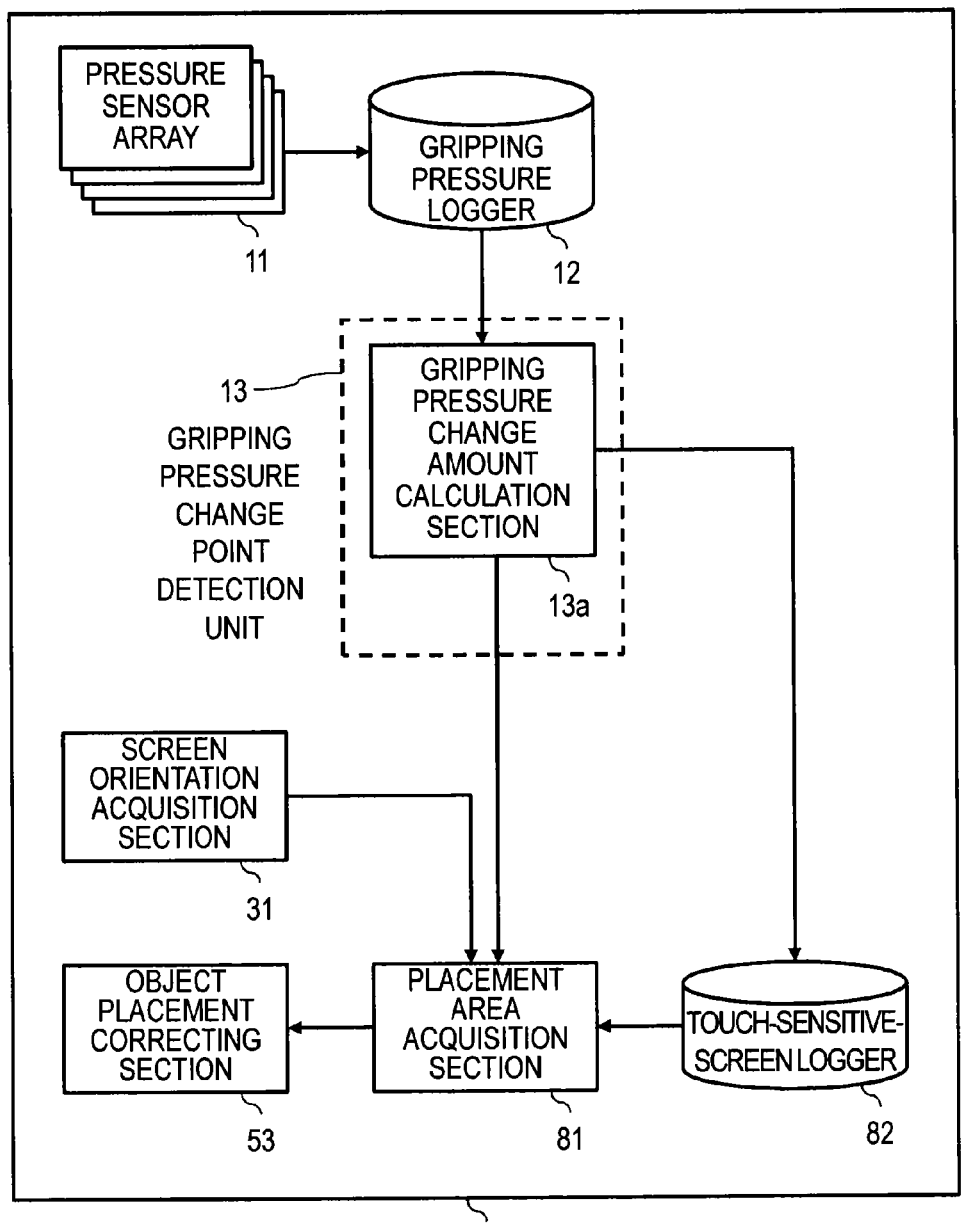
FIG. 24 is a block diagram showing the configuration of a portable terminal according to a seventh embodiment.
Figure 26:
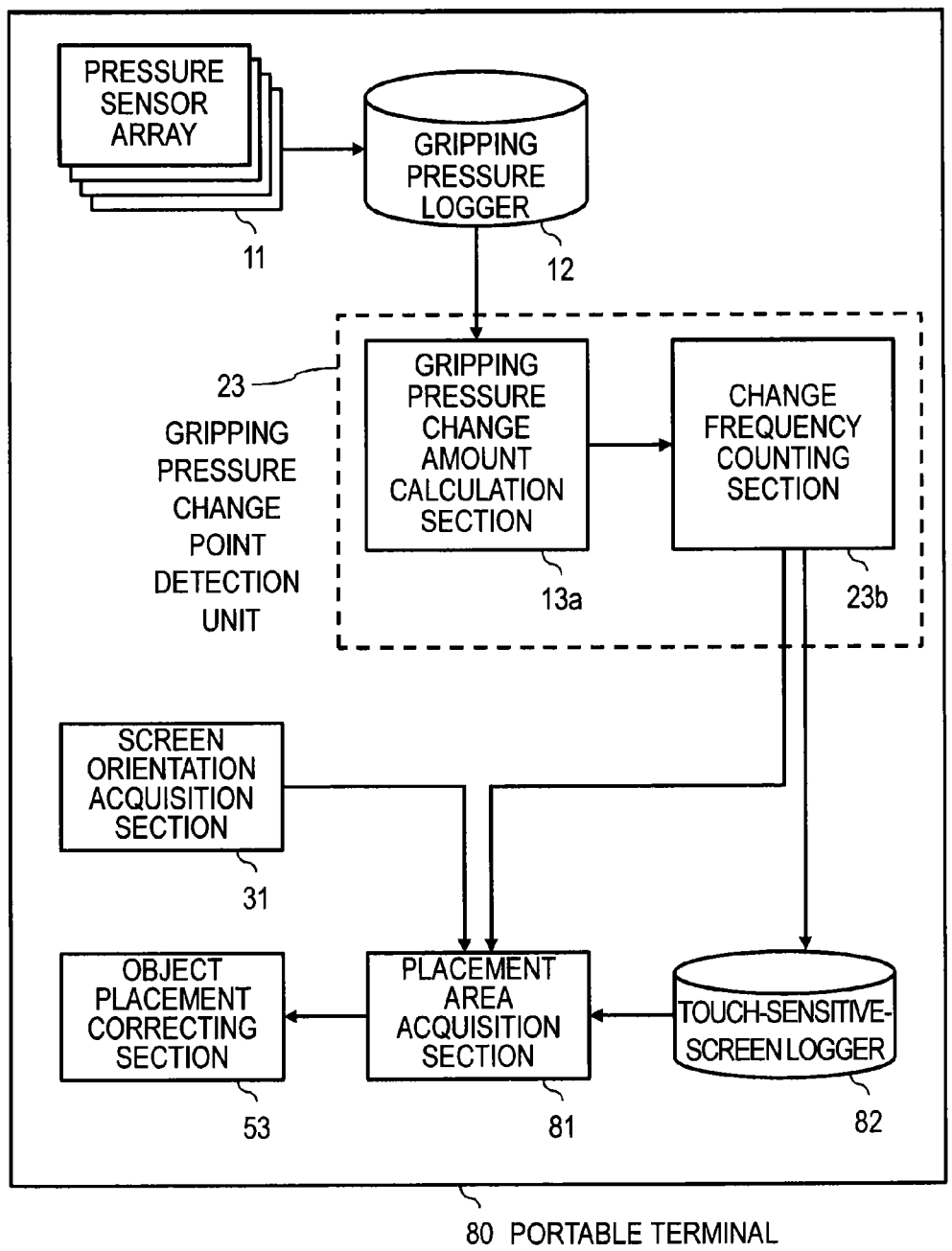
FIG. 26 is a block diagram showing the configuration of a portable terminal according to an eighth embodiment.

The operation principle of the placement area acquisition section 81 included in the portable terminals 70 and 80 in the seventh and eighth embodiments shown in FIG. 24 and FIG. 26 will be described next with reference to FIGS. 10A to 10D. FIGS. 10A to 10D are views showing examples of a touch sensitive screen operation log recorded by a touch-sensitive-screen logger 82 included in the portable terminals 70 and 80 in the seventh and eighth embodiments. The touch-sensitive-screen logger 82 included in the portable terminal 80 in the eighth embodiment records a touch sensitive screen operation log for each combination of the operation state and the screen orientation in a time zone during which the combination of the operation state and the screen orientation remains unchanged. For example, FIG. 10A shows an example of a touch sensitive screen operation log recorded by the touch-sensitive-screen logger 82 in a time zone during which the conditions of left-hand gripping, left-handed operation, and top of the screen being displayed at the top of the figure are satisfied, when the screen orientation acquisition section 31 acquires the screen orientation (top of the screen displayed at the top of the figure) and when the operation state is left-hand gripping and left-handed operation. FIG. 10B shows an example of a touch sensitive screen operation log recorded by the touch-sensitive-screen logger 82 in a time zone during which the conditions of right-hand gripping, right-handed operation, and the top of the screen being displayed at the top of the figure are satisfied, when the screen orientation acquisition section 31 acquires the screen orientation (top of the screen displayed at the top of the figure) and when the operation state is right-hand gripping and right-handed operation. FIG. 10C shows an example of a touch sensitive screen operation log recorded by the touch-sensitive-screen logger 82 in a time zone during which the conditions of left-hand gripping, left-handed operation, and the top of the screen being displayed to the right of the figure are satisfied, when the screen orientation acquisition section 31 acquires the screen orientation (top of the screen displayed to the right of the figure) and when the operation state is left-hand gripping and left-handed operation. FIG. 10D shows an example of a touch sensitive screen operation log recorded by the touch-sensitive-screen logger 82 in a time zone during which the conditions of right-hand gripping, right-handed operation, and the top of the screen being displayed to the right of the figure are satisfied, when the screen orientation acquisition section 31 acquires the screen orientation (top of the screen displayed to the right of the figure) and when the operation state is right-hand gripping and right-handed operation.

In the figures, the touch sensitive screen operation log is represented by broken crosses. The size of the thumb is considered; a circular area (enclosed by a broken line in the figures) with a predetermined radius around a cross, which is a part of the touch sensitive screen operation log, is considered as an area included in the placement area; and a range containing all of the circular areas can be acquired as an optimum placement area 2FA. Since the placement area acquisition section 81 in the portable terminals 70 and 80 of the seventh and eighth embodiments acquires the optimum placement area 2FA on the basis of the touch sensitive screen operation log recorded by the touch-sensitive-screen logger 82, the user's individual features can be considered, and user convenience can be improved further.

Operation Principle of Placement Area Acquisition Section 61

Figure 20:
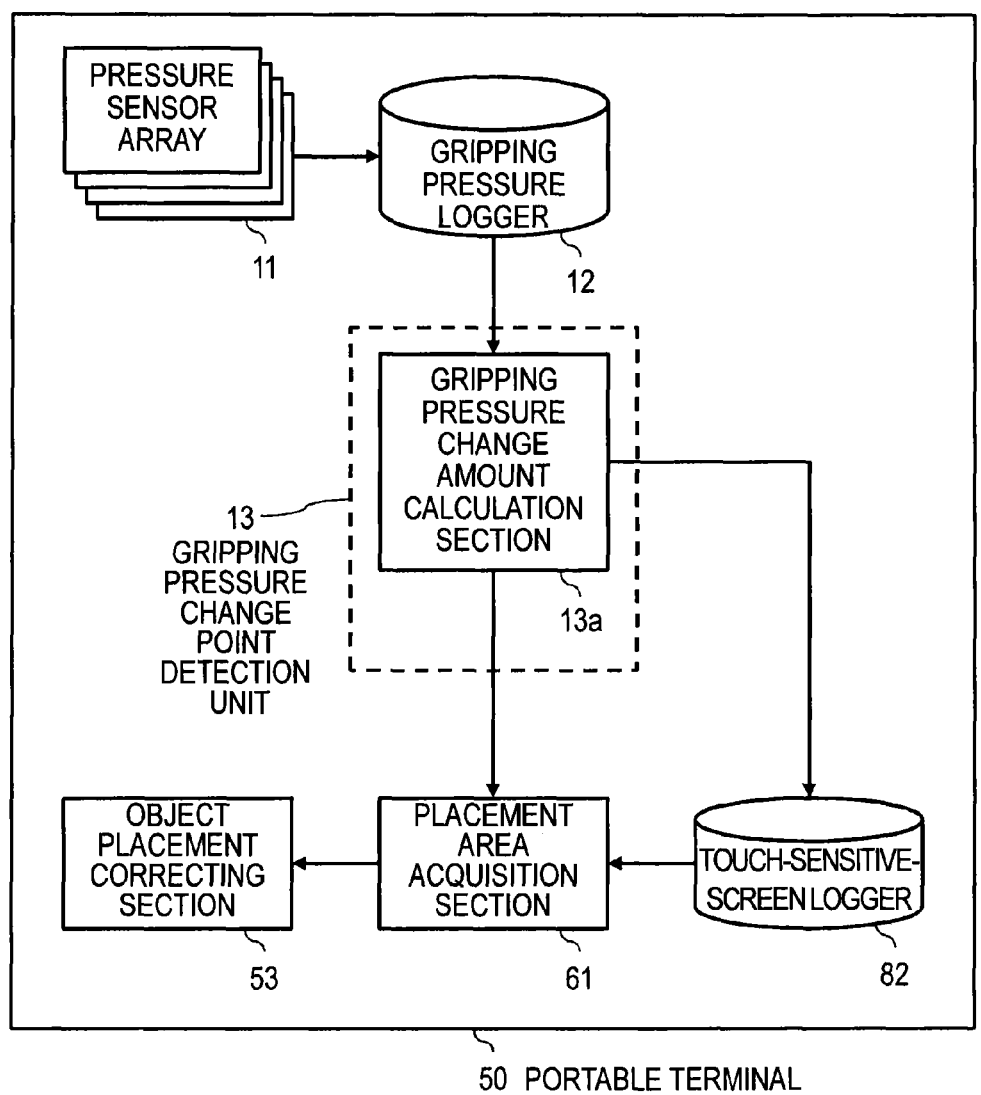
FIG. 20 is a block diagram showing the configuration of a portable terminal according to a fifth embodiment.
Figure 22:
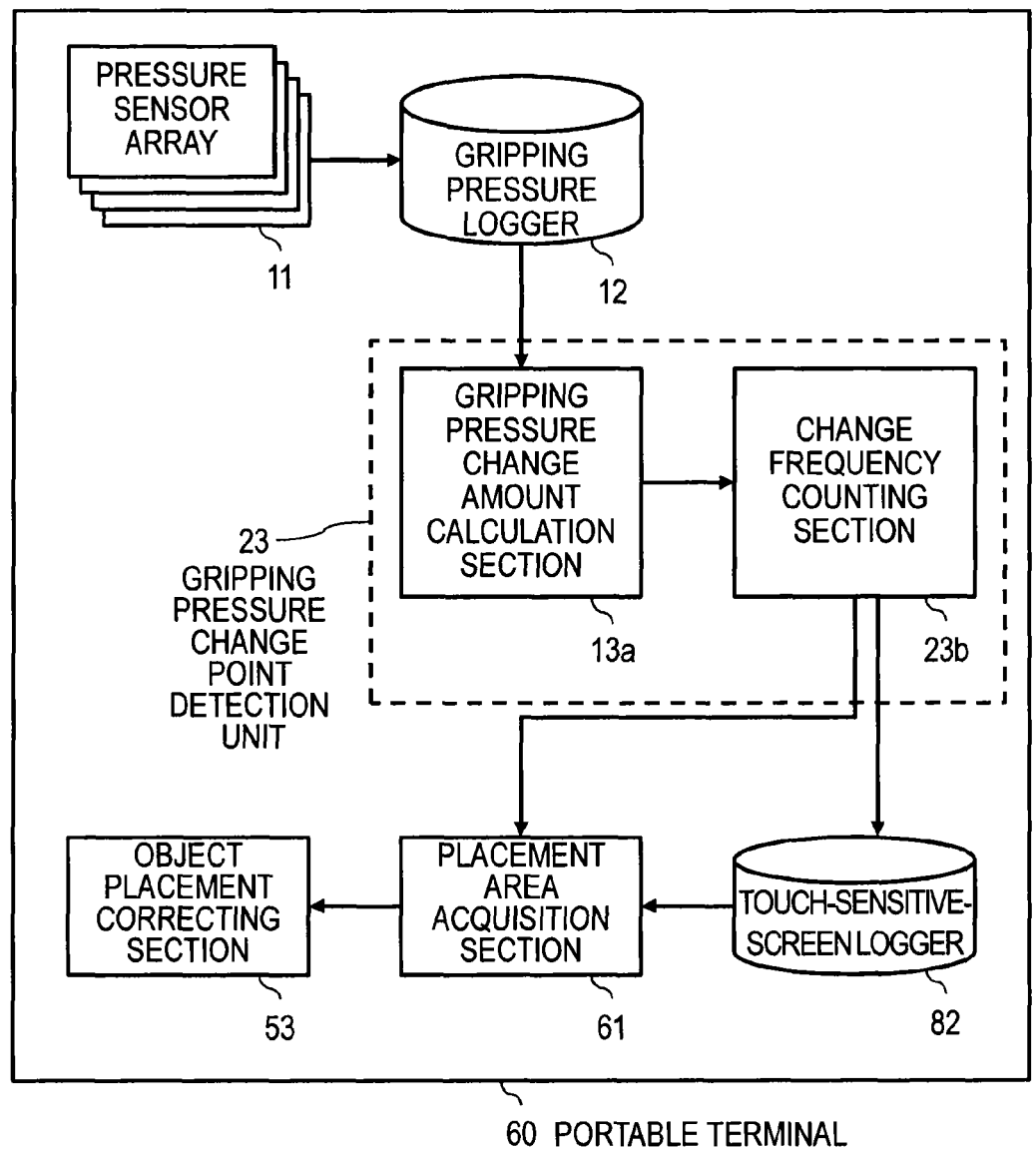
FIG. 22 is a block diagram showing the configuration of a portable terminal according to a sixth embodiment.

The operation principle of the placement area acquisition section 61 included in the portable terminals 50 and 60 in the fifth and sixth embodiments shown in FIG. 20 and FIG. 22 will be described next. A touch-sensitive-screen logger 82 included in the portable terminals 50 and 60 in the fifth and sixth embodiments records a touch sensitive screen operation log for each operation state in a time zone during which the operation state remains unchanged, the operation log being classified according to the position where the gripping pressure change point appears. More specifically, the touch-sensitive-screen logger 82 classifies the operation log to cases (a) when the gripping pressure change point appears at any of the edges of the portable terminals 50 and 60 and (b) when the gripping pressure change point does not appear at any of the edges of the portable terminals 50 and 60; and records an operation log for each gripping pressure change point separately only for (a). The portable terminals 50 and 60 in the fifth and sixth embodiments do not have a screen orientation acquisition section 31 and do not acquire the screen orientation (top-to-bottom direction) beforehand, which will be described later in detail. Therefore, as described with reference to FIGS. 5A to 5D and FIGS. 7A to 7C, since the top-to-bottom direction is unknown, even if it can be determined whether the operation state is one-handed operation or two-handed operation, it cannot be determined whether left-handed operation or right-handed operation is performed in one-handed operation. In that case, in the same way as described before with reference to FIG. 7C, an optimum placement area is acquired to include both a controllable range determined from an operation log at a gripping pressure change point acquired in left-handed operation and a controllable range determined from an operation log at the same gripping pressure change point acquired in right-handed operation. As described above, since the placement area acquisition section 61 included in the portable terminals 50 and 60 in the fifth and sixth embodiments approximately acquires an optimum placement area according to the touch-sensitive-screen operation log recorded by the touch-sensitive-screen logger 82 even if the screen orientation (top-tobottom direction) is unknown, variability among individual users can be taken into account, further increasing user convenience.

Operation of Object Placement Correcting Section 53

Figure 11A:
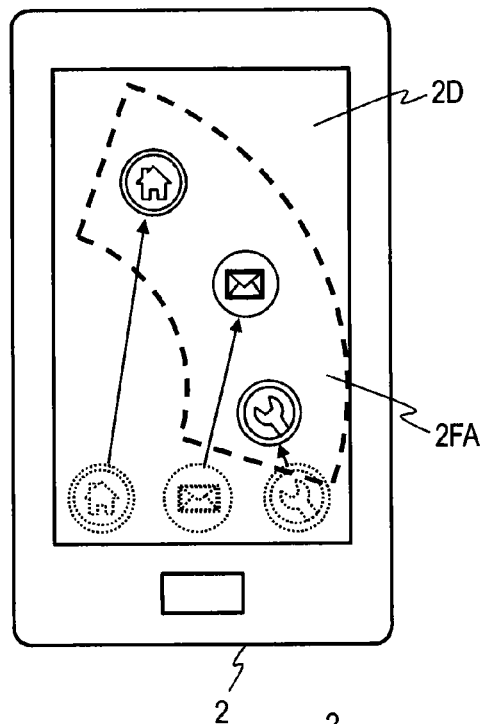
FIG. 11A to FIG. 11C are views showing examples of optimum positions of controllable objects: Icons are shown at FIG. 11A; keys are shown at FIG. 11B; and links are shown at FIG. 11C.
Figure 11B:
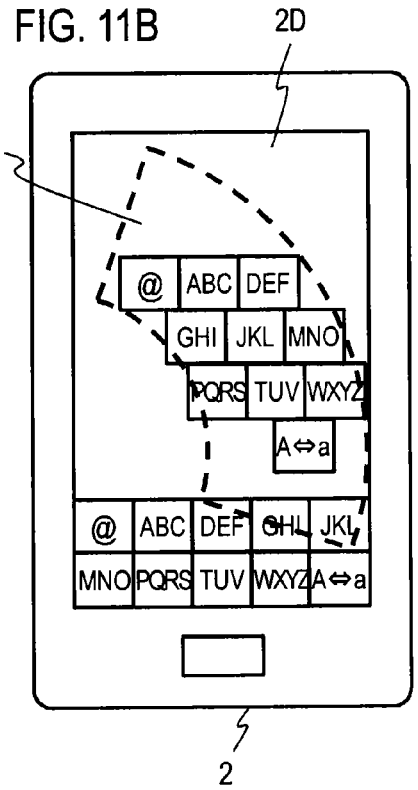
Figure 11C:
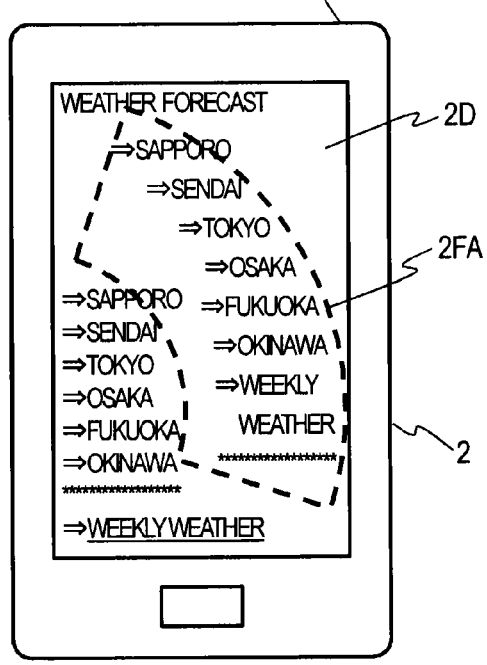

The operation of an object placement correcting section 53 included in the portable terminals 10, 20, 30, 40, 50, 60, 70, and 80 (represented by the portable terminal 2) in all the embodiments shown in FIGS. 12, 14, 16, 18, 20, 22, 24, and 26 will be described next with reference to FIGS. 11A, 11B, and 11C. The object placement correcting section 53 corrects the placement of a controllable object in accordance with the optimum placement area specified by the placement area acquisition section 51, 61, 71, or 81. The controllable object is a general term for objects that are displayed on the display screen 2D of the portable terminal 2 and can be controlled by the user, as described earlier. More specifically, they are icons, links, keyboards, and the like. When areas enclosed by a broken line in FIGS. 11A, 11B, and 11C are the optimum placement area 2FA, user convenience is improved by moving icons that can be clicked on the display screen 2D of the portable terminal 2 into the optimum placement area 2FA, as shown in FIG. 11A, for example. Re-positioning the displayed keys into the optimum placement area 2FA on the display screen 2D as shown in FIG. 11B, for example, will be helpful for the user in preparing documents and searching for keywords. Re-positioning links on a page displayed by a web browser into the optimum placement area 2FA as shown in FIG. 11C, for example, allows the user to continue web browsing with less stress.

FIRST EMBODIMENT

Figure 13:
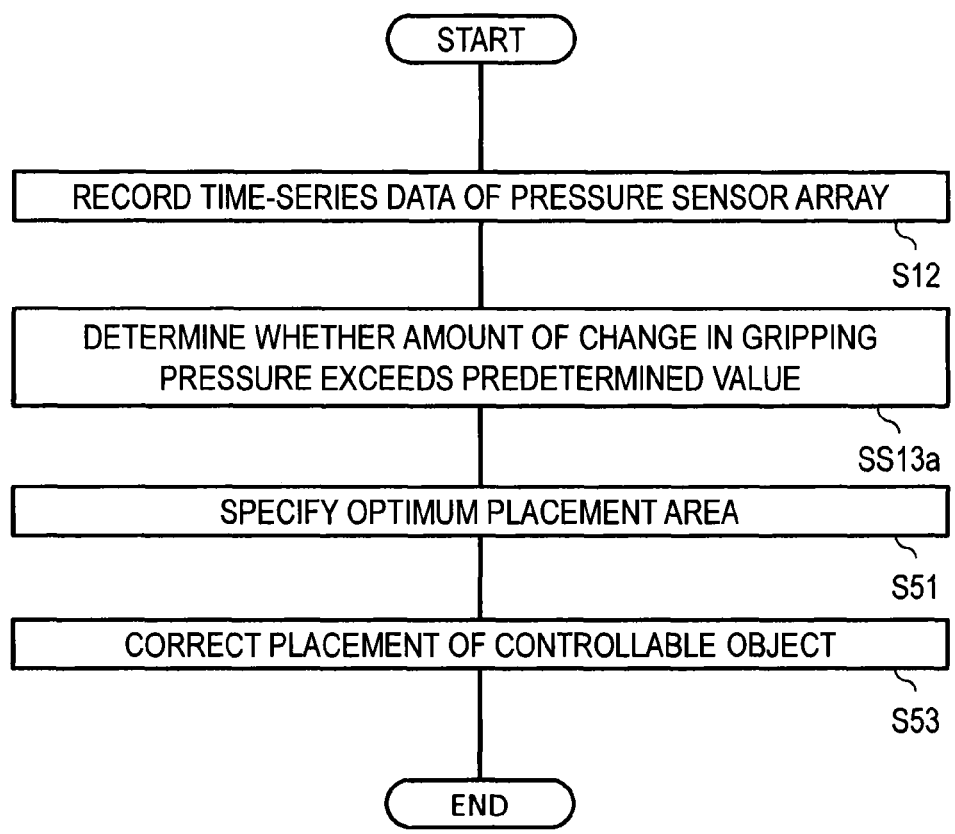
FIG. 13 is a flowchart illustrating the operation of the portable terminal according to the first embodiment.

The portable terminal 10 according to the first embodiment will be described in detail with reference to FIGS. 12 and 13. FIG. 12 is a block diagram showing the configuration of the portable terminal 10 in this embodiment. FIG. 13 is a flowchart illustrating the operation of the portable terminal 10 in this embodiment. The portable terminal 10 in this embodiment includes the pressure sensor array 11, the gripping pressure logger 12, a gripping pressure change point detection unit 13, the placement area acquisition section 51, the placement area storage 52, and the object placement correcting section 53. The gripping pressure change point detection unit 13 includes the gripping pressure change amount calculation section 13a. The gripping pressure logger 12 records time-series changes in gripping pressure at each pressure sensor forming the pressure sensor array 11 (S12). The gripping pressure change amount calculation section 13a acquires the time-series changes in gripping pressure at each pressure sensor and determines whether the amount of change in gripping pressure per unit time at any pressure sensor exceeds the predetermined value (SS13a).

The placement area storage 52 stores in advance the shape of a placement area and relative position information of a gripping pressure change point with respect to the placement area. For example, the shape of a placement area can be that described in "Operation of specifying optimum placement area in placement area acquisition section 51". When the amount of change in gripping pressure per unit time exceeds the predetermined value at any of the pressure sensors, the placement area acquisition section 51 specifies an optimum placement area for a controllable object by shifting the placement area according to the gripping pressure change point detected by the gripping pressure change point detection unit 13 as a position (change point) where the amount of change in gripping pressure per unit time exceeds the predetermined value, and the relative position information between the gripping pressure change point and the placement area, stored in the placement area storage 52 (S51).

In contrast, when the amount of change in gripping pressure per unit time does not exceed the predetermined value at any of the pressure sensors, the placement area acquisition section 51 determines that the operation state is two-handed operation and does not execute the subsequent processes (S51). The object placement correcting section 53 corrects the placement of the controllable object in accordance with the placement area acquired by the placement area acquisition section 51 (S53). As described before, when the placement area acquisition section 51 determines that the operation state is two-handed operation and does not execute the subsequent processes (does not acquire a placement area), the object placement correcting section 53 may re-position the controllable object at a position suited to two-handed operation (default position).

As described above, according to the portable terminal 10 of the first embodiment, an optimum placement area for a controllable object can be appropriately acquired, regardless of variability in gripping features among individual users.

SECOND EMBODIMENT

Figure 15:
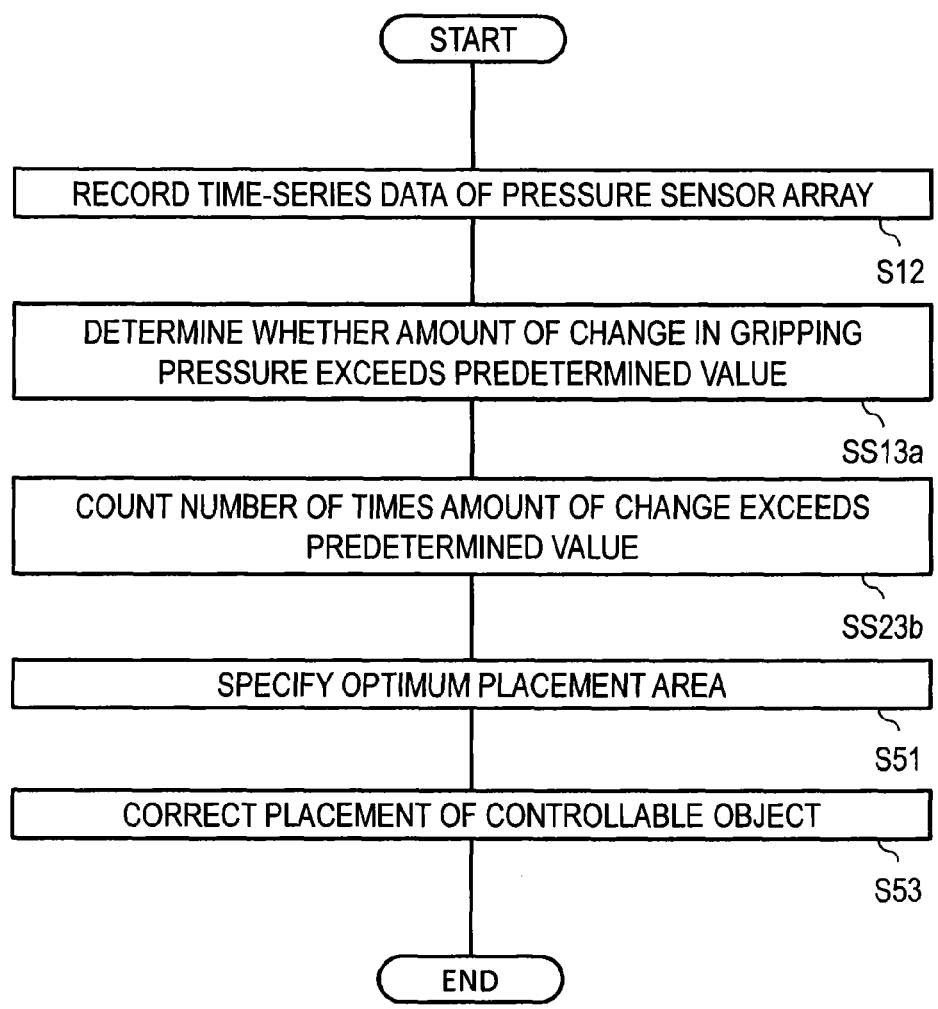
FIG. 15 is a flowchart illustrating the operation of the portable terminal according to the second embodiment.

The portable terminal 20 according to the second embodiment, which has further improved accuracy in acquiring an optimum placement area compared with the portable terminal 10 of the first embodiment, will be described next in detail with reference to FIGS. 14 and 15. FIG. 14 is a block diagram showing the configuration of the portable terminal 20 of this embodiment. FIG. 15 is a flowchart illustrating the operation of the portable terminal 20 of this embodiment. The portable terminal 20 of this embodiment includes the pressure sensor array 11, the gripping pressure logger 12, a gripping pressure change point detection unit 23, the placement area acquisition section 51, the placement area storage 52, and the object placement correcting section 53. The gripping pressure change point detection unit 23 includes the gripping pressure change amount calculation section 13a and the change frequency counting section 23b. This embodiment differs from the first embodiment in that the gripping pressure change point detection unit 13 in the first embodiment is replaced by the gripping pressure change point detection unit 23 in this embodiment, and the change frequency counting section 23b is added in the gripping pressure change point detection unit 23.

The gripping pressure logger 12 records time-series changes in gripping pressure at each pressure sensor forming the pressure sensor array 11 (S12). The gripping pressure change amount calculation section 13a acquires the time-series changes in gripping pressure at each pressure sensor and determines whether the amount of change in gripping pressure per unit time at any pressure sensor exceeds the predetermined value (SS13a). The change frequency counting section 23b counts the number of times the amount of change in gripping pressure per unit time exceeds the predetermined value (change frequency) in each predetermined period of time (SS23b). When the placement area acquisition section 51 is given in a period of time in which the counted change frequency exceeds a predetermined value for any of the pressure sensors, by the gripping pressure change point detection unit 23, a position where the counted change frequency exceeds the predetermined value (change frequency exceeding point) as a gripping pressure change point, the placement area acquisition section 51 specifies an optimum placement area for a controllable object by shifting the placement area read from the placement area storage 52 with respect to the gripping pressure change point according to relative position information of the gripping pressure change point with the placement area (S51). In contrast, when there is no period of time in which the counted change frequency exceeds the predetermined value for any of the pressure sensors, the placement area acquisition section 51 determines that the operation state is two-handed operation and does not execute the subsequent processes (S51). The object placement correcting section 53 corrects the placement of the controllable object in accordance with the placement area specified by the placement area acquisition section 51 (S53). As described before, when the placement area acquisition section 51 determines that the operation state is two-handed operation and does not execute the subsequent processes (does not specify a placement area), the object placement correcting section 53 may re-position the controllable object at a position suited to two-handed operation (default position).

As described above, the portable terminal 20 of the present embodiment can not only provide the same advantages as in the first embodiment but also acquire a placement area with higher accuracy. For example, when an impact is exerted in a part where the controlling finger is not placed and when a value indicated by a pressure sensor in the vicinity of the impact changes abruptly, the portable terminal 10 in the first embodiment could misjudge it as an operation of the controlling finger and acquire a placement area with reference to that part. In the portable terminal 20 in this embodiment, however, an abrupt change in value indicated by the pressure sensors is just counted as a single change, and an optimum placement area is specified with reference to the gripping pressure change point only after the change frequency at any pressure sensor exceeds the predetermined frequency. The number of misjudgments like that described above can be reduced considerably. The portable terminal 20 in the second embodiment can acquire a placement area with higher accuracy than the portable terminal 10 in the first embodiment.

THIRD EMBODIMENT

Figure 17:
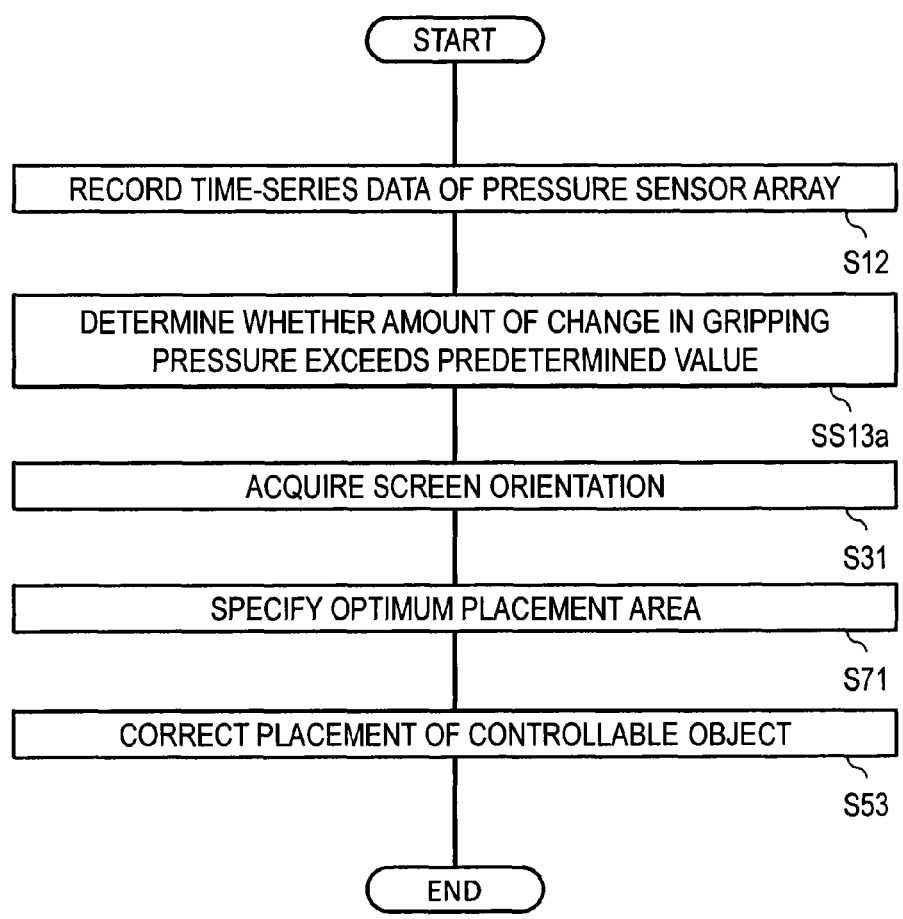
FIG. 17 is a flowchart illustrating the operation of the portable terminal according to the third embodiment.

The portable terminal 30 according to the third embodiment, which has an enhanced function of acquiring a placement area in comparison with the one in the portable terminal 10 of the first embodiment, will be described next in detail with reference to FIGS. 16 and 17. FIG. 16 is a block diagram showing the configuration of the portable terminal 30 in this embodiment. FIG. 17 is a flowchart illustrating the operation of the portable terminal 30 in this embodiment. The portable terminal 30 in this embodiment includes the pressure sensor array 11, the gripping pressure logger 12, a gripping pressure change point detection unit 13, the screen orientation acquisition section 31, the placement area acquisition section 71, the placement area storage 52, and the object placement correcting section 53. The gripping pressure change point detection unit 13 includes the gripping pressure change amount calculation section 13a. This embodiment differs from the first embodiment in that the screen orientation acquisition section 31, which is not included in the first embodiment, is included in this embodiment, and the placement area acquisition section 51 in the first embodiment is replaced with the placement area acquisition section 71 in this embodiment.

The gripping pressure logger 12 records time-series changes in gripping pressure at each pressure sensor forming the pressure sensor array 11 (S12). The gripping pressure change amount calculation section 13a acquires the time-series changes in gripping pressure at each pressure sensor and determines whether the amount of change in gripping pressure per unit time at any pressure sensor exceeds the predetermined value (SS13a). The screen orientation acquisition section 31 acquires the screen orientation (top-to-bottom direction) of the portable terminal 30 (S31). The placement area acquisition section 71 specifies an optimum placement area for a controllable object in accordance with the acquired screen orientation (top-to-bottom direction) and a change point (S71). The operation of the placement area acquisition section 71 has been described in detail in "Operation of specifying optimum placement area in placement area acquisition section 71". In contrast, when no change point exists at any of the pressure sensors, the placement area acquisition section 71 determines that the operation state is two-handed operation and does not execute the subsequent processes (S71). The object placement correcting section 53 corrects the placement of the controllable object in accordance with the placement area specified by the placement area acquisition section 71 (S53). In the same way as the placement area acquisition section 51, described before, when the placement area acquisition section 71 determines that the operation state is two-handed operation and does not execute the subsequent processes (does not acquire a placement area), the object placement correcting section 53 may re-position the controllable object at a position suited to two-handed operation (default position).

When the screen orientation is detected in step S31 and one longer side of the screen is found to be the top, landscape display is used. Since the finger controllable range in one-handed operation is narrow, as shown in FIG. 2B, it is natural to grip the portable terminal in one hand and operate it with the other hand, or to grip it in two hands and operate it with two hands. Therefore, the placement of the objects is not corrected.

In the portable terminal 30 of this embodiment, the screen orientation acquisition section 31 acquires the screen orientation (top-to-bottom direction), and the placement area acquisition section 71 acquires an optimum placement area according to whether the user's operation state is left-hand gripping and left-handed operation, right-hand gripping and right-handed operation, or two-handed operation, by using two pieces of information (top-to-bottom direction and position of change point). Accordingly, besides the advantages of the first embodiment, a further-limited optimum placement area can be acquired.

FOURTH EMBODIMENT

Figure 19:
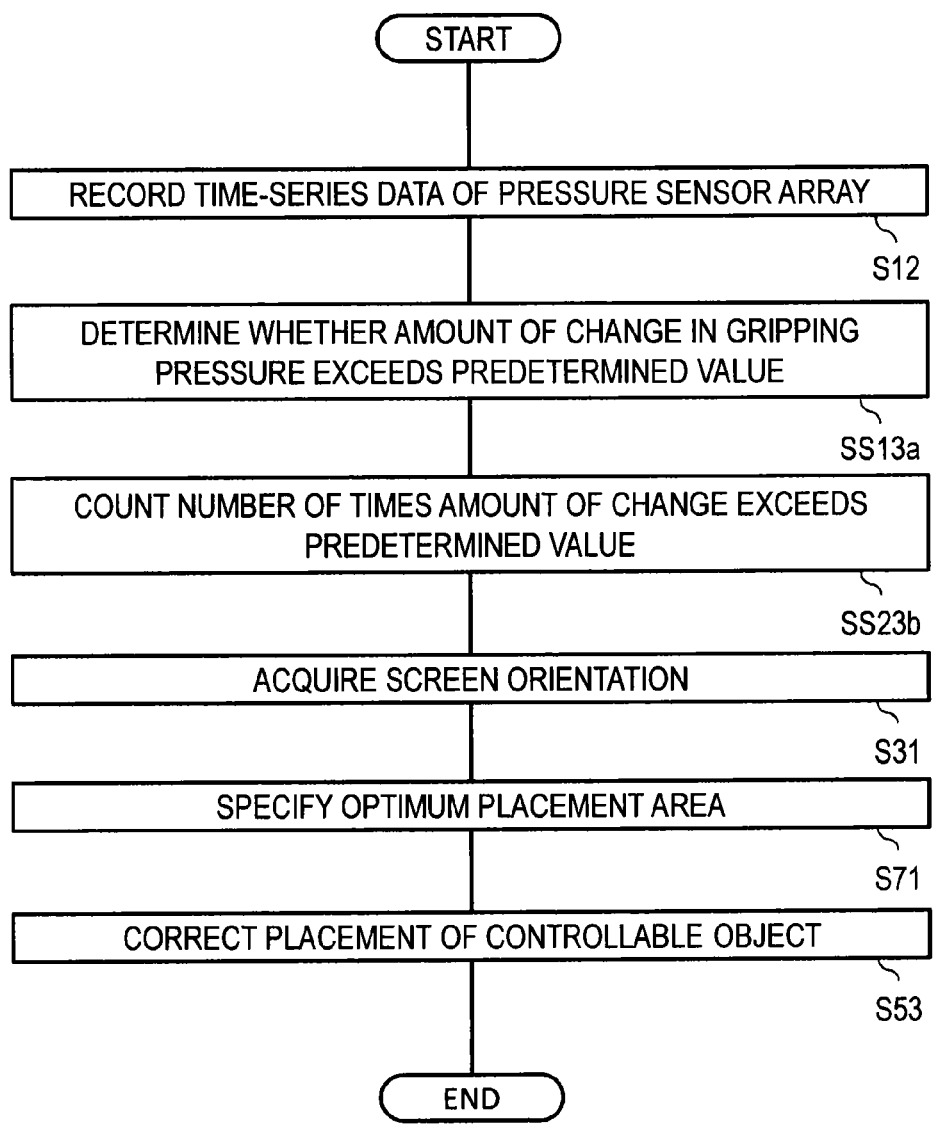
FIG. 19 is a flowchart illustrating the operation of the portable terminal according to the fourth embodiment.

The portable terminal 40 according to the fourth embodiment, which has an enhanced function of acquiring a placement area in comparison with the one in the portable terminal 20 in the second embodiment, will be described next in detail with reference to FIGS. 18 and 19. FIG. 18 is a block diagram showing the configuration of the portable terminal 40 in this embodiment. FIG. 19 is a flowchart illustrating the operation of the portable terminal 40 in this embodiment. The portable terminal 40 in this embodiment includes the pressure sensor array 11, the gripping pressure logger 12, a gripping pressure change point detection unit 23, the screen orientation acquisition section 31, the placement area acquisition section 71, the placement area storage 52, and the object placement correcting section 53. The gripping pressure change point detection unit 23 includes the gripping pressure change amount calculation section 13a and the change frequency counting section 23b. This embodiment differs from the second embodiment in that the screen orientation acquisition section 31, which is not included in the second embodiment, is included in this embodiment, and the placement area acquisition section 51 in the second embodiment is replaced with the placement area acquisition section 71 in this embodiment.

The gripping pressure logger 12 records time-series changes in gripping pressure at each pressure sensor forming the pressure sensor array 11 (S12). The gripping pressure change amount calculation section 13a acquires the time-series changes in gripping pressure at each pressure sensor and determines whether the amount of change in gripping pressure per unit time at any pressure sensor exceeds the predetermined value (SS13a). The change frequency counting section 23b counts the number of times the amount of change in gripping pressure per unit time exceeds the predetermined value (change frequency) in each predetermined period of time (SS23b). The screen orientation acquisition section 31 acquires the screen orientation (top-to-bottom direction) of the portable terminal 40 (S31). The placement area acquisition section 71 specifies an optimum placement area for a controllable object in accordance with the acquired screen orientation (top-to-bottom direction) and a change frequency exceeding point obtained as a gripping pressure change point (S71). The operation of the placement area acquisition section 71 has been described in detail in "Operation of specifying optimum placement area in placement area acquisition section 71". In contrast, when no change frequency exceeding point exists at any of the pressure sensors, the placement area acquisition section 71 determines that the operation state is two-handed operation and does not execute the subsequent processes (S71). The object placement correcting section 53 corrects the placement of the controllable object in accordance with the placement area specified by the placement area acquisition section 71 (S53). In the same way as the placement area acquisition section 51, described before, when the placement area acquisition section 71 determines that the operation state is two-handed operation and does not execute the subsequent processes (does not acquire a placement area), the object placement correcting section 53 may re-position the controllable object at a position suited to two-handed operation (default position).

In the portable terminal 40 of this embodiment, the screen orientation acquisition section 31 acquires the screen orientation (top-to-bottom direction), and the placement area acquisition section 71 acquires an optimum placement area according to whether the user's operation state is left-hand gripping and left-handed operation, right-hand gripping and right-handed operation, or two-handed operation by using two pieces of information (top-to-bottom direction and the position of change frequency exceeding point). Accordingly, besides the advantages of the second embodiment, a further-limited optimum placement area can be acquired.

FIFTH EMBODIMENT

Figure 21:
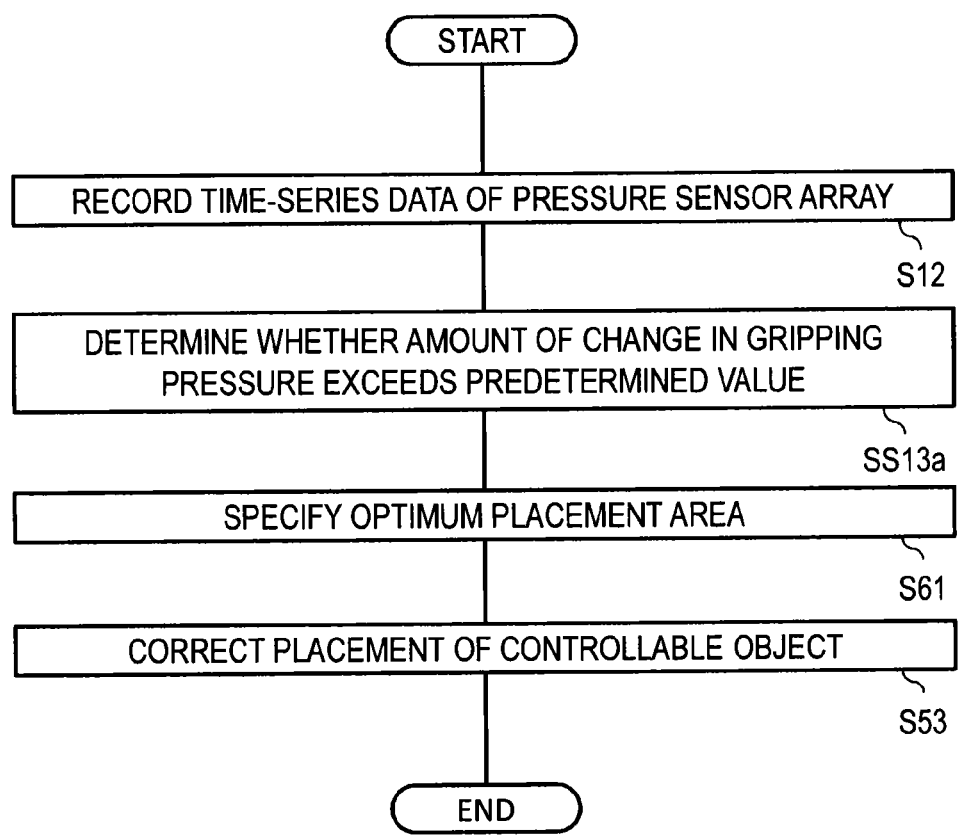
FIG. 21 is a flowchart illustrating the operation of the portable terminal according to the fifth embodiment.

The portable terminal 50 according to the fifth embodiment, obtained by taking into consideration variability in controlling finger movement range among individual users, by acquiring an optimum placement area with the use of touch sensitive screen operation history (operation log), in the portable terminal 10 in the first embodiment, will be described next in detail with reference to FIGS. 20 and 21. FIG. 20 is a block diagram showing the configuration of the portable terminal 50 in this embodiment. FIG. 21 is a flowchart illustrating the operation of the portable terminal 50 in this embodiment. The portable terminal 50 in this embodiment includes the pressure sensor array 11, the gripping pressure logger 12, a gripping pressure change point detection unit 13, the placement area acquisition section 61, the touch-sensitive-screen logger 82, and the object placement correcting section 53.

The gripping pressure change point detection unit 13 includes the gripping pressure change amount calculation section 13a. This embodiment differs from the first embodiment in that the placement area storage 52 in the first embodiment is replaced with the touch-sensitive-screen logger 82 in the present embodiment, and the placement area acquisition section 51 in the first embodiment is replaced with the placement area acquisition section 61 in the present embodiment. A description of components denoted by the same reference numerals as in the first embodiment will be omitted in this embodiment.

As described in "Operation principle of placement area acquisition section 61", the touch-sensitive-screen logger 82 records an operation log for each gripping pressure change point separately only when a gripping pressure change point appears at any of the edges of the portable terminal 50. A controllable range is obtained for each operation log acquired for each gripping pressure change point. More specifically, a circular area having a predetermined radius needs to be acquired from a touch sensitive screen pressing position for the acquisition of one piece of operation log. The touch-sensitive-screen logger 82 can acquire, for example, as a controllable range, an area that includes all circular areas obtained by acquiring a predetermined number of pieces of operation log. The placement area acquisition section 61 manipulates the obtained controllable range (for example, converts the controllable range into a simple-shape area), or specifies the obtained controllable range as an optimum placement area (S61). In contrast, when no change point exists at any of the pressure sensors, the placement area acquisition section 61 determines that the operation state is two-handed operation and does not execute the subsequent processes (S61). The object placement correcting section 53 corrects the placement of the controllable object in accordance with the placement area specified by the placement area acquisition section 61 (S53). In the same way as the placement area acquisition section 51, described before, when the placement area acquisition section 61 determines that the operation state is two-handed operation and does not execute the subsequent processes (does not acquire a placement area), the object placement correcting section 53 may re-position the controllable object at a position suited to two-handed operation (default position).

As described before, since the portable terminal 50 in the present embodiment does not have a screen orientation acquisition section 31, the screen orientation (top-to-bottom direction) is unknown. Therefore, the controllable range calculated for each gripping pressure change point may include both an operation log with the right thumb and an operation log with the left thumb. When this range is specified as an optimum placement area, the optimum placement area includes a small but unnecessary area, as described with reference to FIG. 7. However, since the placement area acquisition section 61 approximately acquires an optimum placement area according to the touch-sensitive-screen operation history (operation log) while variability in controlling finger movement range among individual users is taken into account, user convenience is further improved.

SIXTH EMBODIMENT

Figure 23:
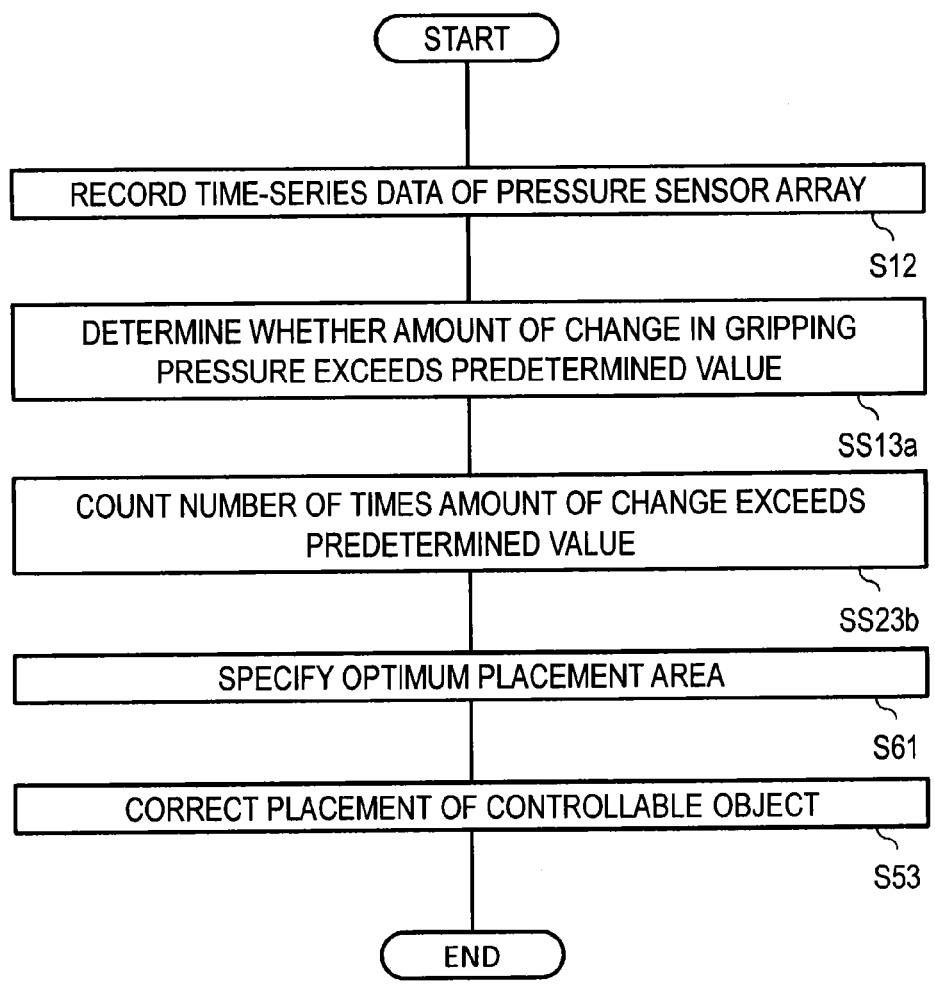
FIG. 23 is a flowchart illustrating the operation of the portable terminal according to the sixth embodiment.

The portable terminal 60 according to the sixth embodiment, obtained by taking into consideration variability in controlling finger movement range among individual users, by acquiring an optimum placement area with the use of touch sensitive screen operation history (operation log), in the portable terminal 20 in the second embodiment, will be described next in detail with reference to FIGS. 22 and 23. FIG. 22 is a block diagram showing the configuration of the portable terminal 60 in this embodiment. FIG. 23 is a flowchart illustrating the operation of the portable terminal 60 in this embodiment. The portable terminal 60 in this embodiment includes the pressure sensor array 11, the gripping pressure logger 12, a gripping pressure change point detection unit 23, the placement area acquisition section 61, the touch-sensitive-screen logger 82, and the object placement correcting section 53. The gripping pressure change point detection unit 23 includes the gripping pressure change amount calculation section 13a and the change frequency counting section 23b. This embodiment differs from the second embodiment in that the placement area storage 52 in the second embodiment is replaced with the touch-sensitive-screen logger 82 in the present embodiment, and the placement area acquisition section 51 in the second embodiment is replaced with the placement area acquisition section 61 in the present embodiment. A description of components denoted by the same reference numerals as in the second embodiment will be omitted in this embodiment.

As described in "Operation principle of placement area acquisition section 61", the touch-sensitive-screen logger 82 records an operation log for each gripping pressure change point separately only when a gripping pressure change point appears at any of the edges of the portable terminal 60. A controllable range is obtained for each operation log acquired for each gripping pressure change point. More specifically, a circular area having a predetermined radius needs to be acquired from a touch sensitive screen pressing position for the acquisition of one piece of operation log. The touch-sensitive-screen logger 82 can acquire, for example, as a controllable range, an area that includes all circular areas obtained by acquiring a predetermined number of pieces of operation log. The placement area acquisition section 61 manipulates the obtained controllable range (for example, converts the controllable range into a simple-shape area), or specifies the obtained controllable range as an optimum placement area (S61). In contrast, when no change frequency exceeding point exists at any of the pressure sensors, the placement area acquisition section 61 determines that the operation state is two-handed operation and does not execute the subsequent processes (S61). The object placement correcting section 53 corrects the placement of the controllable object in accordance with the placement area specified by the placement area acquisition section 61 (S53). In the same way as the placement area acquisition section 51, described before, when the placement area acquisition section 61 determines that the operation state is two-handed operation and does not execute the subsequent processes (does not specify a placement area), the object placement correcting section 53 may re-position the controllable object at a position suited to two-handed operation (default position).

As described before, since the portable terminal 60 in the present embodiment does not have a screen orientation acquisition section 31, the screen orientation (top-to-bottom direction) is unknown. Therefore, the controllable range calculated for each gripping pressure change point may include both an operation log with the right thumb and an operation log with the left thumb. When this range is specified as an optimum placement area, the optimum placement area includes a small but unnecessary area, as described with reference to FIG. 7. However, since the placement area acquisition section 61 approximately acquires an optimum placement area according to the touch-sensitive-screen operation history (operation log) while variability in controlling finger movement range among individual users is taken into account, user convenience is further improved.

SEVENTH EMBODIMENT

Figure 25:
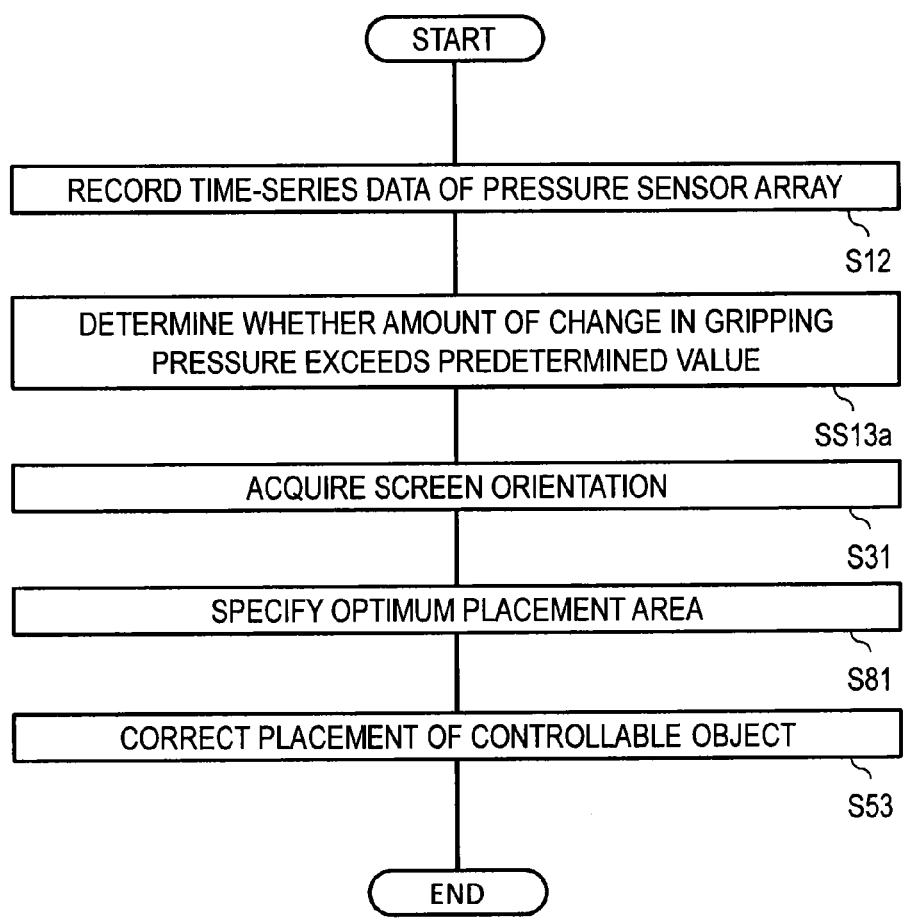
FIG. 25 is a flowchart illustrating the operation of the portable terminal according to the seventh embodiment.

The portable terminal 70 according to the seventh embodiment, obtained by taking into consideration variability in controlling finger movement range among individual users, by acquiring an optimum placement area with the use of touch sensitive screen operation history (operation log), in the portable terminal 30 in the third embodiment, will be described next in detail with reference to FIGS. 24 and 25. FIG. 24 is a block diagram showing the configuration of the portable terminal 70 in this embodiment. FIG. 25 is a flowchart illustrating the operation of the portable terminal 70 in this embodiment. The portable terminal 70 in this embodiment includes the pressure sensor array 11, the gripping pressure logger 12, a gripping pressure change point detection unit 13, the screen orientation acquisition section 31, the placement area acquisition section 81, the touch-sensitive-screen logger 82, and the object placement correcting section 53. The gripping pressure change point detection unit 13 includes the gripping pressure change amount calculation section 13a. This embodiment differs from the third embodiment in that the placement area storage 52 in the third embodiment is replaced with the touch-sensitive-screen logger 82 in the present embodiment, and the placement area acquisition section 71 in the third embodiment is replaced with the placement area acquisition section 81 in the present embodiment. A description of components denoted by the same reference numerals as in the third embodiment will be omitted in this embodiment.

As described in "Operation principle of placement area acquisition section 81", the touch-sensitive-screen logger 82 records a touch sensitive screen operation log for each combination of the operation state and the screen orientation in a time zone during which the combination of the operation state and the screen orientation remains unchanged. More specifically, for example, an operation log is recorded when the operation state is left-hand gripping and left-handed operation and when the top of the screen is displayed at the top of the figure. In addition, an operation log is separately recorded when the operation state is left-hand gripping and left-handed operation and when the top of the screen is displayed at the bottom of the figure. In addition, an operation log is separately recorded when the operation state is right-hand gripping and right-handed operation and when the top of the screen is displayed at the top of the figure. These operation logs are recorded separately for the corresponding combinations of the operation states and the screen orientation, and a controllable range is obtained for each operation log acquired for each combination of the operation state and the screen orientation.

As described in "Operation principle of placement area acquisition section 61", an operation log may be acquired for each classified case for each gripping pressure change point. In the present embodiment, however, it is not necessarily to classify the operation log into cases for each gripping pressure change point. When the combination of the operation state and the screen orientation is identified, since the user grips the terminal according to his or her gripping habit to some extent, the position where a gripping pressure change point appears is fixed and it is not expected that the gripping pressure change point changes significantly. Therefore, the touch-sensitive-screen logger 82 acquires an operation log for each combination of the operation state and the screen orientation. More specifically, a circular area having a predetermined radius needs to be acquired from a touch sensitive screen pressing position for the acquisition of one piece of operation log. The touch-sensitive-screen logger 82 can acquire, for example, as a controllable range, an area that includes all circular areas obtained by acquiring a predetermined number of pieces of operation log. The placement area acquisition section 81 manipulates the obtained controllable range (for example, converts the controllable range into a simple-shape area), or specifies the obtained controllable range as an optimum placement area (S81). In contrast, when no change point exists at any of the pressure sensors, the placement area acquisition section 81 determines that the operation state is two-handed operation and does not execute the subsequent processes (S81). The object placement correcting section 53 corrects the placement of the controllable object in accordance with the placement area specified by the placement area acquisition section 81 (S53). In the same way as the placement area acquisition section 51, described before, when the placement area acquisition section 81 determines that the operation state is two-handed operation and does not execute the subsequent processes (does not specify a placement area), the object placement correcting section 53 may re-position the controllable object at a position suited to two-handed operation (default position).

As described above, according to the portable terminal 70 of this embodiment, the screen orientation acquisition section 31 acquires the screen orientation (top-to-bottom direction), and the placement area acquisition section 81 acquires an optimum placement area according to the touch sensitive screen operation history (operation log). Therefore, besides the advantages of the third embodiment, an optimum placement area can be specified while the variability in controlling finger movement range among individual users is taken into consideration, further improving user convenience.

EIGHTH EMBODIMENT

Figure 27:
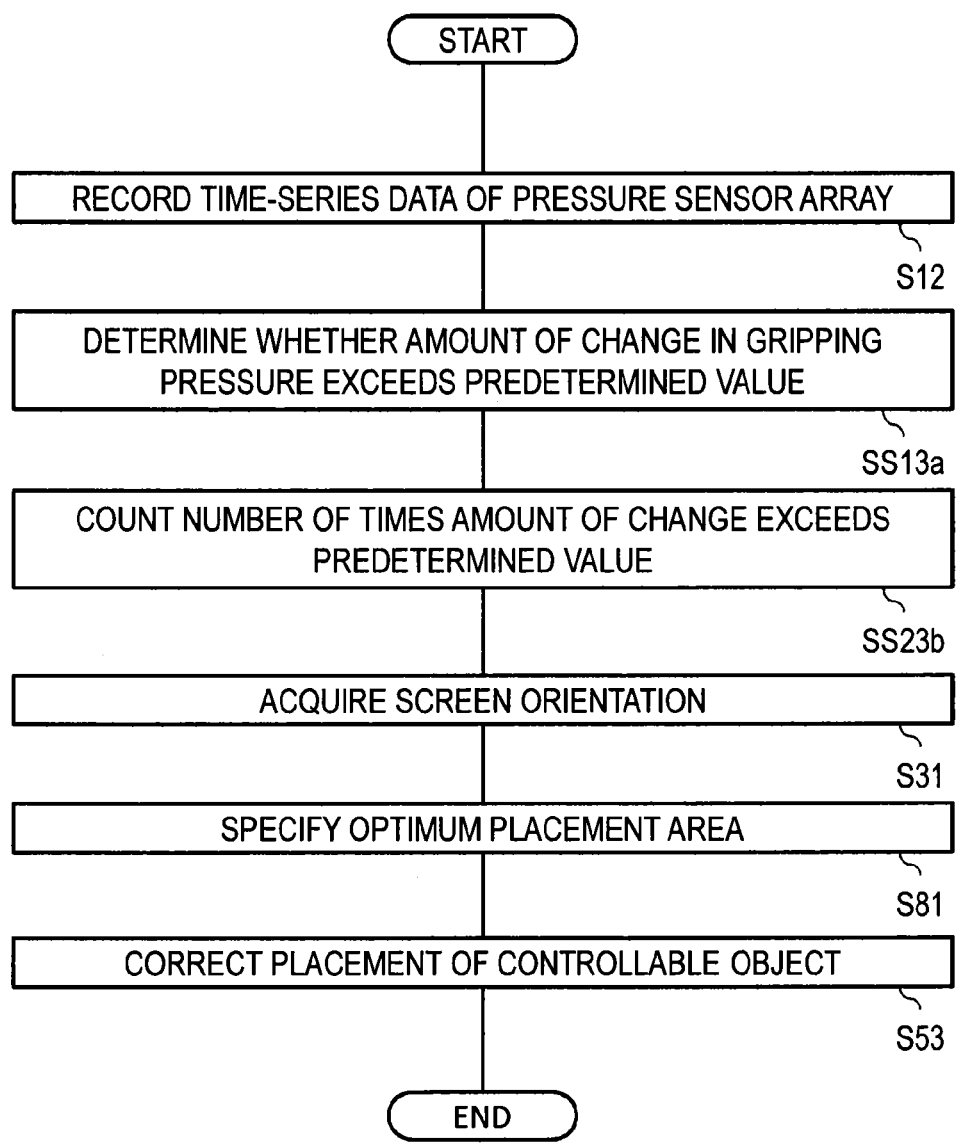
FIG. 27 is a flowchart illustrating the operation of the portable terminal according to the eighth embodiment.

The portable terminal 80 according to the eighth embodiment, obtained by taking into consideration variability in controlling finger movement range among individual users, by acquiring an optimum placement area with the use of touch sensitive screen operation history (operation log), in the portable terminal 40 in the fourth embodiment, will be described next in detail with reference to FIGS. 26 and 27. FIG. 26 is a block diagram showing the configuration of the portable terminal 80 in this embodiment. FIG. 27 is a flowchart illustrating the operation of the portable terminal 80 in this embodiment. The portable terminal 80 in this embodiment includes the pressure sensor array 11, the gripping pressure logger 12, a gripping pressure change point detection unit 23, the screen orientation acquisition section 31, the placement area acquisition section 81, the touch-sensitive-screen logger 82, and the object placement correcting section 53. The gripping pressure change point detection unit 23 includes the gripping pressure change amount calculation section 13*a* and the change frequency counting section 23*b*. This embodiment differs from the fourth embodiment in that the placement area storage 52 in the fourth embodiment is replaced with the touch-sensitive-screen logger 82 in the present embodiment, and the placement area acquisition section 71 in the fourth embodiment is replaced with the placement area acquisition section 81 in the present embodiment. A description of components denoted by the same reference numerals as in the fourth embodiment will be omitted in this embodiment.

As described in "Operation principle of placement area acquisition section 81", the touch-sensitive-screen logger 82 records a touch sensitive screen operation log for each combination of the operation state and the screen orientation in a time zone during which the combination of the operation state and the screen orientation remains unchanged. More specifically, for example, an operation log is recorded when the operation state is left-hand gripping and left-handed operation and when the top of the screen is displayed at the top of the figure. In addition, an operation log is separately recorded when the operation state is left-hand gripping and left-handed operation and when the top of the screen is displayed at the bottom of the figure. In addition, an operation log is separately recorded when the operation state is right-hand gripping and right-handed operation and when the top of the screen is displayed at the top of the figure. These operation logs are recorded separately for the corresponding combinations of the operation states and the screen orientation, and a controllable range is obtained for each operation log acquired for each combination of the operation state and the screen orientation.

As described in "Operation principle of placement area acquisition section 61", an operation log may be acquired for each classified case for each gripping pressure change point. In the present embodiment, however, it is not necessarily to classify the operation log into cases for each gripping pressure change point. When the combination of the operation state and the screen orientation is identified, since the user grips the terminal according to his or her gripping habit to some extent, the position where a gripping pressure change point appears is fixed and it is not expected that the gripping pressure change point changes significantly. Therefore, the touch-sensitive-screen logger 82 acquires an operation log for each combination of the operation state and the screen orientation. More specifically, a circular area having a predetermined radius needs to be acquired from a touch sensitive screen pressing position for the acquisition of one piece of operation log. The touch-sensitive-screen logger 82 can acquire, for example, as a controllable range, an area that includes all circular areas obtained by acquiring a predetermined number of pieces of operation log. The placement area acquisition section 81 manipulates the obtained controllable range (for example, converts the controllable range into a simple-shape area), or specifies the obtained controllable range as an optimum placement area (S81). In contrast, when no change frequency exceeding point exists at any of the pressure sensors, the placement area acquisition section 81 determines that the operation state is two-handed operation and does not execute the subsequent processes (S81). The object placement correcting section 53 corrects the placement of the controllable object in accordance with the placement area specified by the placement area acquisition section 81 (S53). In the same way as the placement area acquisition section 51, described before, when the placement area acquisition section 81 determines that the operation state is two-handed operation and does not execute the subsequent processes (does not specify or acquire a placement area), the object placement correcting section 53 may re-position the controllable object at a position suited to two-handed operation (default position).

As described above, according to the portable terminal 80 of this embodiment, the screen orientation acquisition section 31 acquires the screen orientation (top-to-bottom direction), and the placement area acquisition section 81 acquires an optimum placement area according to the touch sensitive screen operation history (operation log). Therefore, besides the advantages of the fourth embodiment, an optimum placement area can be specified while the variability in controlling finger movement range among individual users is taken into consideration, further improving user convenience.

Each type of processing described above may be executed not only time-sequentially according to the order in the description but also in parallel or individually when necessary or according to the processing capability of each apparatus that executes the processing. Appropriate changes can be made to the above embodiments without departing from the scope of the present invention.

When the configurations described above are implemented by a computer, the processing details of the functions that should be provided by each apparatus are described in a program. When the program is executed by the computer, the processing functions are implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

The program is distributed by selling, transferring, or lending a portable recording medium, such as a DVD or a CD-ROM, with the program recorded on it, for example. The program may also be distributed by storing the program in a storage unit of a server computer and transferring the program from the server computer to another computer through a network.

A computer that executes this type of program first stores the program recorded on a portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated equivalent to a program (something that is not a direct instruction to the computer but is data or the like that has characteristics that determine the processing executed by the computer).

In the description given above, each apparatus is implemented by executing the predetermined program on the computer, but at least a part of the processing details may be implemented by hardware.

What is claimed is:

1. A mobile information terminal provided with a pressure sensor array that acquires a gripping pressure distribution, the mobile information terminal comprising:
    circuitry configured to function as
        a gripping pressure logger adapted to record time-series changes in gripping pressure at each pressure sensor forming the pressure sensor array;
        a gripping pressure change point detection unit comprising a gripping pressure change amount calculation section adapted to acquire time-series changes in gripping pressure at each pressure sensor and to determine whether the amount of change in gripping pressure per unit time exceeds a predetermined value at any pressure sensor; and
        a placement area acquisition section adapted to acquire a placement area for a controllable object with reference to a position where the amount of change in gripping pressure per unit time exceeds the predetermined value, the position being hereafter referred to as a change point, when the amount of change in gripping pressure per unit time exceeds the predetermined value at any pressure sensor, wherein
    the gripping pressure change point detection unit further comprises a change frequency counting section adapted to count the number of times the amount of change in gripping pressure per unit time exceeds the predetermined value in each predetermined period of time, the number being hereafter referred to as a change frequency; and
    the placement area acquisition section acquires the placement area for the controllable object with reference to a position where the counted change frequency exceeds a predetermined value, the position being hereafter referred to as a change frequency exceeding point, in a period of time in which the counted change frequency exceeds the predetermined value.

2. The mobile information terminal according to claim 1, wherein
    the circuitry is further configured to function as a screen orientation acquisition section adapted to acquire the screen orientation of the mobile information terminal, and
    the placement area acquisition section acquires the placement area for the controllable object in accordance with the acquired screen orientation and the change point.

3. The mobile information terminal according to claim 1, wherein
    the circuitry is further configured to function as a screen orientation acquisition section adapted to acquire the screen orientation of the mobile information terminal,
    wherein the placement area acquisition section acquires the placement area for the controllable object in accordance with the acquired screen orientation and the change frequency exceeding point.

4. The mobile information terminal according to claim 2, wherein, when the change point is on the right edge of the mobile information terminal with reference to the screen orientation, the placement area acquisition section determines that the operation state of the mobile information terminal is right-hand gripping and right-handed operation; when the change point is on the left edge of the mobile information terminal with reference to the screen orientation, the placement area acquisition section determines that the operation state of the mobile information terminal is left-hand gripping and left-handed operation; and the placement area acquisition section acquires the placement area for the controllable object in accordance with the change point.

5. The mobile information terminal according to claim 3, wherein, when the change frequency exceeding point is on the right edge of the mobile information terminal with reference to the screen orientation, the placement area acquisition section determines that the operation state of the mobile information terminal in the period of time is right-hand gripping and right-handed operation; when the change frequency exceeding point is on the left edge of the mobile information terminal with reference to the screen orientation, the placement area acquisition section determines that the operation state of the mobile information terminal in the period of time is left-hand gripping and left-handed operation; and the placement area acquisition section acquires the placement area for the controllable object in each period of time in accordance with the change frequency exceeding point.

6. A placement area acquisition method executed by a mobile information terminal provided with a pressure sensor array that acquires a gripping pressure distribution, the placement area acquisition method comprising:

a gripping pressure logging step of recording time-series changes in gripping pressure at each pressure sensor forming the pressure sensor array;

a gripping pressure change point detection step comprising a gripping pressure change amount calculation sub step of acquiring time-series changes in gripping pressure at each pressure sensor and of determining whether the amount of change in gripping pressure per unit time exceeds a predetermined value at any pressure sensor; and a placement area acquisition step of acquiring, when the amount of change in gripping pressure per unit time exceeds the predetermined value at any pressure sensor, a placement area for a controllable object with reference to a position where the amount of change in gripping pressure per unit time exceeds the predetermined value, the position being hereafter referred to as a change point, wherein the gripping pressure change point detection step further comprises a change frequency counting sub step of counting the number of times the amount of change in gripping pressure per unit time exceeds the predetermined value in each predetermined period of time, the number being hereafter referred to as a change frequency; and in the placement area acquisition step, in a period of time in which the counted change frequency exceeds a predetermined value, the placement area for the controllable object is acquired with reference to a position where the counted change frequency exceeds a predetermined value.

7. The placement area acquisition method according to claim 6, further comprising a screen orientation acquisition step of acquiring the screen orientation of the mobile information terminal;

wherein, in the placement area acquisition step, the placement area for the controllable object is acquired in accordance with the acquired screen orientation and the change point.

8. A non-transitory computer readable recording medium on which is recorded a program for causing a computer to execute the placement area acquisition method according to claim 6.

9. A non-transitory computer readable recording medium on which is recorded a program for causing a computer to execute the placement area acquisition method according to claim 7.

* * * * *